United States Patent
Lee et al.

(10) Patent No.: US 10,153,811 B2
(45) Date of Patent: Dec. 11, 2018

(54) COMMUNICATION SYSTEM WITH COMMUNICATION-LAYER MAXIMIZATION MECHANISM AND METHOD OF OPERATION THEREOF

(71) Applicant: Samsung Electronics Co., Ltd., Gyeonggi-Do (KR)

(72) Inventors: Jungwon Lee, San Diego, CA (US);
Jung Hyun Bae, San Diego, CA (US);
Hyukjoon Kwon, San Diego, CA (US);
Inyup Kang, San Diego, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 384 days.

(21) Appl. No.: 13/893,819

(22) Filed: May 14, 2013

(65) Prior Publication Data
US 2013/0336372 A1    Dec. 19, 2013

Related U.S. Application Data

(60) Provisional application No. 61/659,904, filed on Jun. 14, 2012.

(51) Int. Cl.
*H04B 7/0413* (2017.01)
*H04B 7/0456* (2017.01)
*H04B 7/06* (2006.01)

(52) U.S. Cl.
CPC ......... *H04B 7/0413* (2013.01); *H04B 7/0486* (2013.01); *H04B 7/0628* (2013.01)

(58) Field of Classification Search
CPC . H04B 7/0413; H04B 7/0486; H04W 52/241; H04L 1/0026
See application file for complete search history.

(56) References Cited

U.S. PATENT DOCUMENTS

| | | | |
|---|---|---|---|
| 7,260,079 B1 | 8/2007 | Chapman et al. | |
| 7,342,845 B2 | 3/2008 | Hammons et al. | |
| 8,611,244 B2* | 12/2013 | Zhang | H04B 7/0413 370/252 |
| 9,071,389 B2* | 6/2015 | Baker | H04B 7/0417 |
| 2004/0002364 A1 | 1/2004 | Trikkonen et al. | |

(Continued)

FOREIGN PATENT DOCUMENTS

WO    2009106090 A1    9/2009

OTHER PUBLICATIONS

Park, Ok-Sun et al., "Efficient Link Adaptation Scheme using Precoding for LTE-Advanced Uplink MIMO", Feb. 2011, vol. 36, No. 2, pp. 163-165.

(Continued)

*Primary Examiner* — Patrick Edouard
*Assistant Examiner* — Eboni Hughes

(57) ABSTRACT

A communication system includes: a receiver resource module configured to determine a receiver-antenna count for characterizing a device; an adjustment module, coupled to the receiver resource module, configured to generate a receiver-capacity profile exceeding a capability associated with the receiver-antenna count with a control unit; and a report module, coupled to the adjustment module, configured to transmit the receiver-capacity profile for communicating a communication content for communicating with the device.

16 Claims, 7 Drawing Sheets

(56) References Cited

U.S. PATENT DOCUMENTS

| | | | |
|---|---|---|---|
| 2007/0010957 A1* | 1/2007 | Sampath | H04B 1/1027 702/57 |
| 2007/0098106 A1* | 5/2007 | Khojastepour | H04L 1/06 375/267 |
| 2008/0084944 A1* | 4/2008 | Park | H04B 7/0413 375/267 |
| 2009/0262695 A1* | 10/2009 | Chen | H04L 5/0053 370/329 |
| 2009/0323860 A1* | 12/2009 | Ghauri | H04L 25/03006 375/299 |
| 2011/0142147 A1* | 6/2011 | Chen | H04L 25/03343 375/260 |
| 2011/0222616 A1* | 9/2011 | Jiang | H04B 7/0417 375/260 |
| 2011/0250848 A1* | 10/2011 | Bergljung | H04B 7/0417 455/67.11 |
| 2012/0087332 A1* | 4/2012 | Kim | H04B 7/063 370/329 |
| 2012/0127948 A1* | 5/2012 | Chung | H04L 5/0053 370/329 |
| 2012/0196612 A1* | 8/2012 | Tan | H04B 7/0486 455/452.1 |
| 2013/0033989 A1* | 2/2013 | Barbieri | H04L 1/0003 370/242 |
| 2013/0058424 A1* | 3/2013 | Enescu | H04B 7/0486 375/267 |
| 2013/0077707 A1* | 3/2013 | Koivisto | H04B 7/024 375/295 |
| 2013/0107746 A1* | 5/2013 | Wang | H04L 5/0023 370/252 |
| 2013/0288624 A1* | 10/2013 | Mujtaba | H04B 7/0817 455/140 |
| 2013/0315284 A1* | 11/2013 | Nammi | H04B 7/0486 375/219 |
| 2013/0336372 A1* | 12/2013 | Lee | H04B 7/0413 375/219 |
| 2014/0056156 A1* | 2/2014 | Jongren | H04L 1/0026 370/252 |
| 2014/0140424 A1* | 5/2014 | Clevorn | H04B 7/0417 375/267 |
| 2014/0219326 A1* | 8/2014 | Ko | H04B 7/0417 375/228 |
| 2014/0219373 A1* | 8/2014 | Mobasher | H01Q 3/2605 375/267 |
| 2014/0348260 A1* | 11/2014 | Lorca Hernando | H04B 7/0617 375/295 |
| 2015/0131751 A1* | 5/2015 | Bayesteh | H04B 7/0413 375/267 |

OTHER PUBLICATIONS

Wolfgang, A., Akhtman, J., Chen, S., and Hanzo L., "Iterative MIMO Detection for Rank-Deficient Systems", IEEE signal processing letters, Nov. 2006, vol. 1, No. 11, pp. 699-702.

U.S. Appl. No. 13/523,824, filed Jun. 14, 2012 in the name of Au Yeung et al.

U.S. Appl. No. 13/460,630, filed Apr. 30, 2012 in the name of Kwon et al.

U.S. Appl. No. 13/560,330, filed Jul. 27, 2012 in the name of Lee et al.

\* cited by examiner

COMMUNICATION SYSTEM WITH COMMUNICATION-LAYER MAXIMIZATION MECHANISM AND METHOD OF OPERATION THEREOF

CROSS-REFERENCE TO RELATED APPLICATION(S)

This application claims the benefit of U.S. Provisional Patent Application Ser. No. 61/659,904 filed Jun. 14, 2012, and the subject matter thereof is incorporated herein by reference thereto.

TECHNICAL FIELD

An embodiment of the present invention relates generally to a communication system, and more particularly to a system with communication-layer maximization mechanism.

BACKGROUND

Modern consumer and industrial electronics, especially devices such as cellular phones, navigations systems, portable digital assistants, and combination devices, are providing increasing levels of functionality to support modern life including mobile communication. Research and development in the existing technologies can take a myriad of different directions.

The increasing demand for information in modern life requires users to access information at any time, at increasing data rates. However, telecommunication signals used in mobile communication experience various types of interferences from numerous sources, as well as computational complexities rising from numerous possible formats for communicated information, which affect the quality and speed of the accessible data.

Thus, a need still remains for a communication system with communication-layer maximization mechanism. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

SUMMARY

An embodiment of the present invention provides a communication system, including: a receiver resource module configured to determine a receiver-antenna count for characterizing a device; an adjustment module, coupled to the receiver resource module, configured to generate a receiver-capacity profile exceeding a capability associated with the receiver-antenna count with a control unit; and a report module, coupled to the adjustment module, configured to transmit the receiver-capacity profile for communicating a communication content for communicating with the device.

An embodiment of the present invention provides a communication system, including: a transmitter resource module configured to determine a transmitter-antenna count for transmitting to a device; a transmission setup module, coupled to the transmitter resource module, configured to set a full-rank transmission mode for all antennas corresponding to the transmitter-antenna count; and a transmission module, coupled to the transmission setup module, configured to transmit a transmitter signal according to the full-rank transmission mode regardless of a receiver-capacity profile for communicating with the device.

An embodiment of the present invention provides a method of operation of a communication system including: determining a receiver-antenna count for characterizing a device; generating a receiver-capacity profile exceeding a capability associated with the receiver-antenna count with a control unit; and transmitting the receiver-capacity profile for communicating a communication content for communicating with the device.

An embodiment of the present invention provides a method of operation of a communication system including: determining a transmitter-antenna count for transmitting to a device; setting a full-rank transmission mode for all antennas corresponding to the transmitter-antenna count; and transmitting a transmitter signal according to the full-rank transmission mode regardless of a receiver-capacity profile for communicating with the device.

Certain embodiments of the invention have other steps or elements in addition to or in place of those mentioned above. The steps or elements will become apparent to those skilled in the art from a reading of the following detailed description when taken with reference to the accompanying drawings.

DETAILED DESCRIPTION

Figure 1:
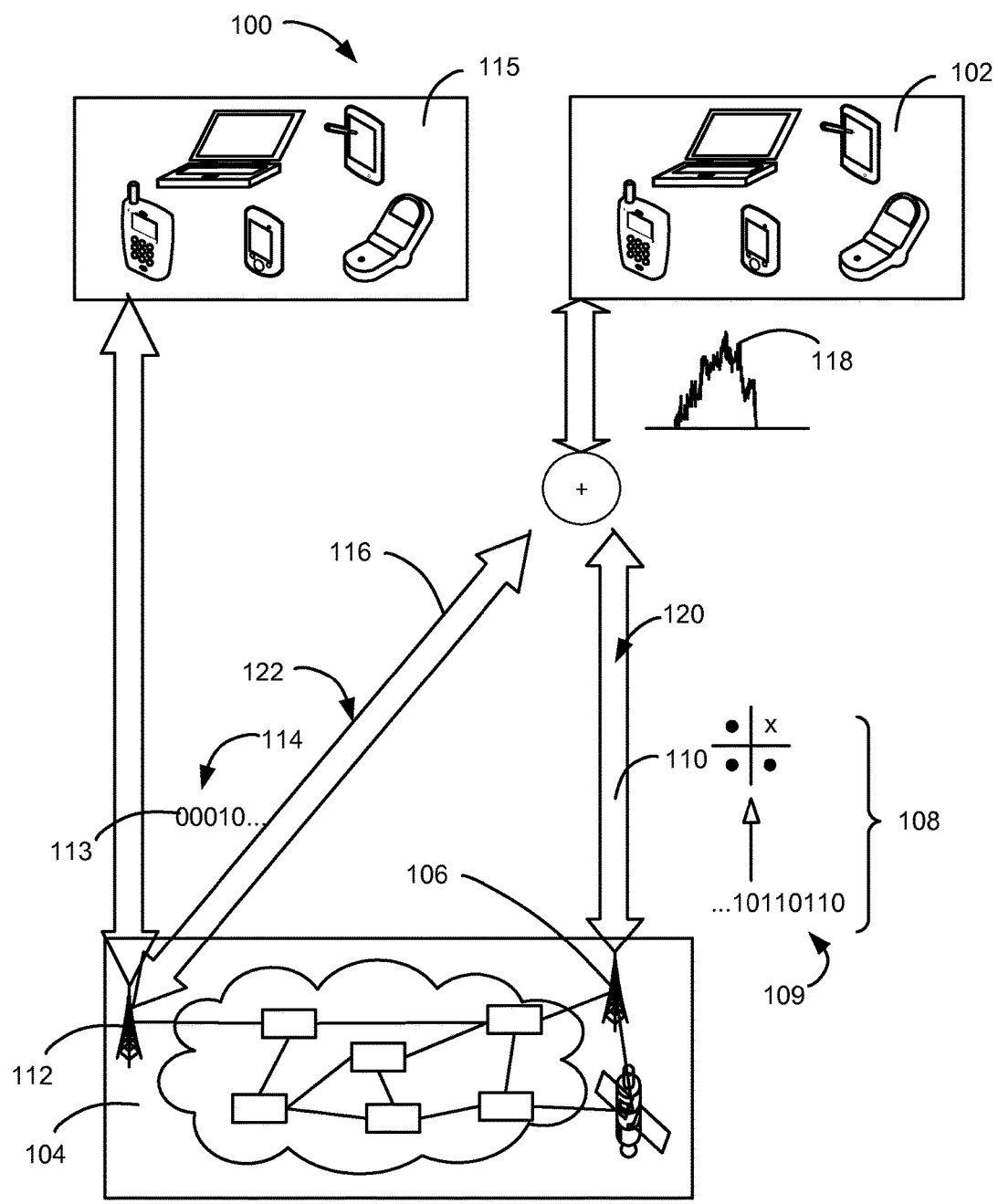
FIG. 1 is a communication system with communication-layer maximization mechanism in an embodiment of the present invention.

The following embodiments can be for processing communication content transmitted using a number of layers exceeding a receiver-antenna count. The communication content can be determined from a receiver signal using an advance receiver utilizing an interference-aware processing mechanism.

A receiver-capacity profile including a number greater than the receiver-antenna count, an advance receiver notification, or a combination thereof can be sent from a receiving device to a transmitting device. A transmitting device can transmit using the number of layers greater than the receiver-antenna count, including a full-rank transmission mode, based on the receiver-capacity profile, based on the advance receiver notification, ignoring the receiver-antenna count, or a combination thereof.

The advance receiver can enable processing of a number of layers greater than the receiver-antenna count, which increases throughput. The receiver-capacity profile indicating a number exceeding the receiver-antenna count when the overall system includes the advance receiver also provides increased throughput. Also, the receiver-capacity profile including the advance receiver notification provides increased efficiency and maximization of available resources. Moreover, an additional-layer adjustment mechanism provides increase throughput and versatility for the overall system.

The following embodiments are described in sufficient detail to enable those skilled in the art to make and use the invention. It is to be understood that other embodiments would be evident based on the present disclosure, and that system, process, or mechanical changes may be made without departing from the scope of an embodiment of the present invention.

In the following description, numerous specific details are given to provide a thorough understanding of the invention. However, it will be apparent that the invention may be practiced without these specific details. In order to avoid obscuring an embodiment of the present invention, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, the invention can be operated in any orientation. The embodiments have been numbered first embodiment, second embodiment, etc. as a matter of descriptive convenience and are not intended to have any other significance or provide limitations for an embodiment of the present invention.

The term "module" referred to herein can include software, hardware, or a combination thereof in an embodiment of the present invention in accordance with the context in which the term is used. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof.

The term "processing" as used herein includes filtering signals, decoding symbols, assembling data structures, transferring data structures, manipulating data structures, and reading and writing data structures. Data structures are defined to be information arranged as symbols, packets, blocks, files, input data, system generated data, such as calculated or generated data, and program data.

Referring now to FIG. 1, therein is shown a communication system 100 with communication-layer maximization mechanism in an embodiment of the present invention. The communication system 100 includes a mobile device 102, such as a cellular phone or a notebook computer, connected to a network 104. The network 104 is a system of wired or wireless communication devices that are connected to each other for enabling communication between devices.

For example, the network 104 can include a combination of wires, transmitters, receivers, antennas, towers, stations, repeaters, telephone network, servers, or client devices for a wireless cellular network. The network 104 can also include a combination of routers, cables, computers, servers, and client devices for various sized area networks.

The network 104 can include a base station 106 for directly linking and communicating with the mobile device 102. The base station 106 can receive wireless signals from the mobile device 102, transmit signals to the mobile device 102, process signals, or a combination thereof. The base station 106 can also relay signals between other base stations, components within the network 104, or a combination thereof.

The mobile device 102 can be connected to the network 104 through the base station 106. For example, the base station 106 can include or be coupled with a cell tower, a wireless router, an antenna, a processing device, or a combination thereof being used to send signals to or receive signals from the mobile device 102, such as a smart phone or a laptop computer.

The mobile device 102 can connect to and communicate with other devices, such as other mobile devices, servers, computers, telephones, or a combination thereof. The mobile device 102 can communicate with other devices by transmitting signals, receiving signals, processing signals, or a combination thereof and displaying a content of the signals, audibly recreating sounds according to the content of the signals, processing according to the content, such as storing an application or updating an operating system.

The base station 106 can be used to wirelessly exchange signals for communication, including voice signals of a telephone call or data representing a webpage and interactions therewith. The base station 106 can also transmit reference signals, training signals, error detection signals, error correction signals, header information, transmission format, protocol information, or a combination thereof.

Based on the communication method, such as code division multiple access (CDMA), orthogonal frequency-division multiple access (OFDMA), Third Generation Partnership Project (3GPP), Long Term Evolution (LTE), or fourth generation (4G) standards, the communication signals can include a reference portion, a header portion, a format portion, an error correction or detection portion, or a combination thereof imbedded in the communicated information. The reference portion, header portion, format portion, error correction or detection portion, or a combination thereof can include a predetermined bit, pulse, wave, symbol, or a combination thereof. The various portions can be embedded within the communicated signals at regular time intervals, frequency, code, or a combination thereof.

The base station 106 can transmit a transmitter signal 108 for communicating communication content 109 with the mobile station 102. The communication content 109 is data from a transmitting device intended for communication by reproduction or processing at a receiving device. For example, the communication content 109 can be a sequence of bits intended for displaying, audibly recreating, executing instructions, storing, or a combination thereof at the mobile station 102.

The base station 106 can modify the communication content 109 to generate and transmit the transmitter signal 108. The transmitter signal 108 is data transmitted by a device for communication. The base station 106 can generate the transmitter signal 108 by modifying, such as by interleaving or adding formatting information, the communication content 109 according to methods or standardizations predetermined by the communication system 100.

For example, the transmitter signal 108 can be a sequence of bits representing the communication content 109, informational bits, processing related bits, such as error correction information or formatting information, or a combination thereof. Also for example, the transmitter signal 108 can be a sequence of symbols according to a modulation scheme, such as quadrature amplitude modulation (QAM) or phase-shift keying (PSK), corresponding to the sequence of bits.

The transmitter signal 108 can arrive at the mobile station 102 after traversing a transmitter channel 110. The transmitter channel 110 can be wireless, wired, or a combination thereof. The transmitter channel 110 can be a direct link between the mobile device 102 and the base station 106 or can include repeaters, amplifiers, or a combination thereof. For example, the transmitter channel 110 can include communication frequency, time slot, packet designation, transmission rate, channel code, or a combination thereof used for communicating signals between the mobile device 102 and the base station 106.

The mobile station 102 can receive signals from other unintended sources. The mobile station 102 can receive interference signal 114 including interference content 113 from an interference source 112. The interference content 113 is data unintended for communication at the receiving device. For example, the interference content 113 can be similar to the communication content 109 but received by the first device 102 while being intended for communication with a different device 115 or for a purpose not currently utilized by the first device 102.

The interference source 112 can be any source generating signals unintended for a specific receiver. The interference signal 114 is data transmitted by the interference source 112 for communication. The interference signal 114 can be similar to the transmitter signal 108 and include bits or symbols representing modifications, such as by interleaving or adding formatting information, for the interference content 113.

For example, the interference signal 114 can be transmissions intended for the difference device 106 but received at the mobile device 102. Also for example, the interference signal 114 can include signals intended for communication with the mobile station 102 for a currently unrelated purpose or for a function currently not accessed on the mobile station 102.

As a more specific example, the interference source 112 can include various transmitters, including a base station or a satellite dish, another mobile communication device, such as a smart phone or a laptop computer, broadcasting station, such as for television or radio, or a combination thereof. Also for example, the interference signal 114 can include wireless signals carrying voice or webpage information associated with a device other than the mobile station 102 or broadcasted television signals when the mobile station 102 is not accessing the television viewing feature.

The interference signal 114 can traverse an interference channel 116 to arrive at the mobile station 102. The interference channel 116 can be similar to the transmitter channel 110 but for the differences in characteristics due to geographical differences between the base station 106 and the interference source 112. The difference between the interference channel 116 and the transmitter channel 110 can also be due to differences in method of communication or resources used between the transmitter signal 108 and the interference signal 114, or a combination thereof.

For example, the interference channel 116 can be wireless, wired, or a combination thereof. The interference channel 116 can be an unintended direct link between the mobile device 102 and the interference source 112 or can include repeaters, amplifiers, or a combination thereof. Also for example, the interference channel 116 can include communication frequency, time slot, packet designation, transmission rate, channel code, or a combination thereof used for transmitting signals between the interference source and the different device 115, and further accessible by the mobile device 102.

The mobile station 102 can receive a receiver signal 118. The receiver signal 118 is information received by a device in the communication system 100. The receiver signal 118 can include the transmitter signal 108 that has been altered from traversing the transmitter channel 110. The receiver signal 118 can further include the interference signal 114 that has been altered from traversing the interference channel 116.

The communication system 100 can estimate a serving channel estimate 120 and an interference channel estimate 122 based on the receiver signal 118. The serving channel estimate 120 is a description of changes to signals caused by the transmitter channel 110. The serving channel estimate 120 can describe and quantize changes in the signal due to reflection, loss, delay, refraction, obstructions, or a combination thereof resulting from traversing between the base station 106 and the mobile device 102. The serving channel estimate 120 can be a matrix value characterizing the transmitter channel 110.

The interference channel estimate 122 is a description of changes to signals caused by the interference channel 116. The interference channel estimate 122 can describe and quantize changes in the signal due to reflection, loss, delay, refraction, obstructions, or a combination thereof resulting from traversing between the interference source 112 and the mobile device 102. The interference channel estimate 122 can be a matrix value characterizing the interference channel 116.

For illustrative purposes, the communication system 100 is described as communicating by transmitting from the base station 106 and receiving at the mobile device 102. However, it is understood that the communication system 100 can also transmit from the mobile device 102 and receive at the base station 106.

Figure 2:
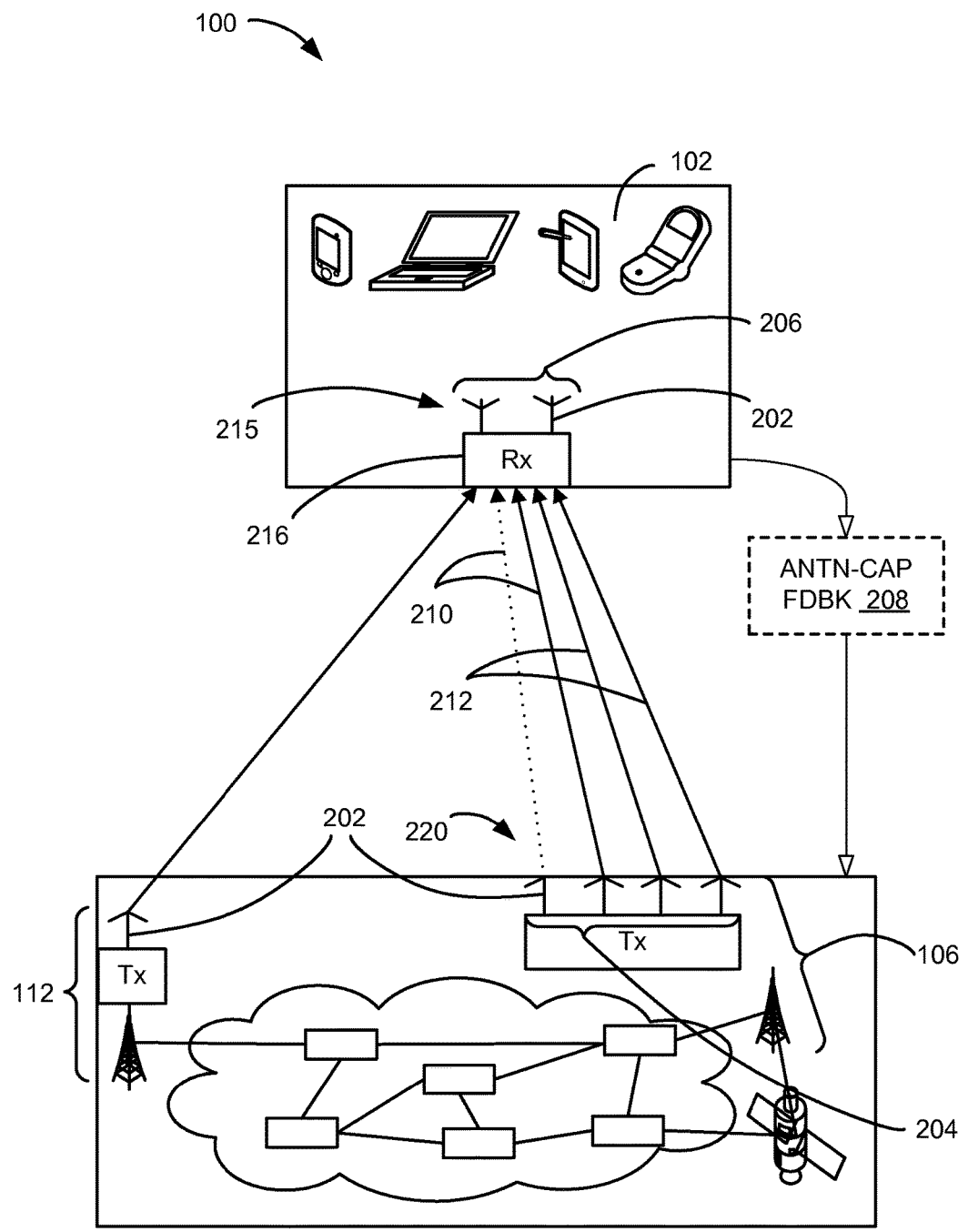
FIG. 2 is an exemplary configuration for the base station and the mobile device.

Referring now to FIG. 2, therein is shown an exemplary configuration for the base station 106 and the mobile device 102. The communication system 100 can include an antenna 202. The antenna 202 can be a device for radiating or receiving radio waves. The antenna 202 can be metallic or conductive device specialized for responding to electro-magnetic energy or changes therein.

The communication system 100 can further include a transmitter-antenna count 204 and a receiver-antenna count 206. The transmitter-antenna count 204 is a number of antennas on a transmitting device available for relevant transmission. The transmitter-antenna count 204 can include the number of antennas being used, that can be used, or a combination thereof to transmit the transmitter signal 108 of FIG. 1. The transmitter-antenna count 204 can be the number of antennas on the base station 106 for communicating with the mobile device 102.

The receiver-antenna count 206 is a number of antennas on a receiving device being used for relevant transmission. The receiver-antenna count 206 can be the number of antennas being used to receive the transmitter signal 108, the receiver signal 118 of FIG. 1, or a combination thereof. The receiver-antenna count 206 can be the number of antennas on the mobile device 102 for communicating with the base station 106.

The communication system 100 can include a receiver-capacity profile 208. The receiver-capacity profile 208 is information describing a receiving capability or measure of a device. For example, the receiver-capacity profile 208 can include a number of antennas that can be used to receive a signal, a number of signal layers for simultaneous processing, a measure of processing power for processing received signals, an identification or categorization of components in the receiving device, such as for a detector or a decoder, or a combination thereof.

The receiver-capacity profile 208 can be sent from the receiving device to the transmitting device regarding a capacity for receiving information. The receiver-capacity profile 208 can be part of a protocol or scheme predetermined by the communication system 100 or by a standard for communication between devices.

For example, the receiver-capacity profile 208 can include a number equal to, greater than, or less than the receiver-antenna count 206 as part of the capacity for receiving information. Also for example, the receiver-capacity profile 208 can include a name or categorization of a device or a component therein being used to receive, process, or a combination thereof for the receiver signal 118.

The communication system 100 can have multiple layers in communication. The communication system 100 can include a signal layer data 210, a further layer data 212, an interference layer 214, or a combination thereof.

The signal layer data 210 is information communicated through a particular set of antennas between a transmitter and an intended receiver. The signal layer data 210 can include the transmitter signal 108 or a portion therein. The signal layer data 210 can include information communicated using a particular instance of the antenna 202 on the base station 106, a particular instance of the antenna 202 on the mobile station 102, or a combination thereof.

The signal layer data 210 can be a portion of the communication content 109 of FIG. 1. The communication system 100 can determine the signal layer data 210 from the receiver signal 118.

The further layer data 212 is information communicated through a different set of antennas between the transmitter and the intended receiver, having one or more antennas different than the ones used for the signal layer data 210. The further layer data 212 can include the communication content 109, the transmitter signal 108, the receiver signal 118, or a portion therein.

The further layer data 212 can include same or different portion or instance of the communication content 109 compared to the signal layer data 210. The further layer data 212 can include information communicated using a different instance of the antenna 202 on the base station 106, a different instance of the antenna 202 on the mobile station 102, or a combination thereof different from the antenna 202 used for communicating the signal layer data 210.

The further layer data 212 can be a different portion of the communication content 109 separate from that of the signal layer data 210. The communication system 100 can determine the further layer data 212 from the receiver signal 118. The communication system 100 can determine the communication content 109 using the signal layer data 210 and the further layer data 212.

For illustrative purposes, the signal layer data 210 will refer to the data corresponding to a number of layers up to the receiver-antenna count 206 and the further layer data 212 will refer to the data corresponding to a different number of layers exclusive of the layers corresponding to the receiver-antenna count 206. However, it is understood that the signal layer data 210 and the further layer data 212 can be data corresponding to individual layers corresponding to the receiver-antenna count 206, with additional layer data corresponding to layers exceeding the receiver-antenna count 206.

The communication system 100 can include a receiver for detecting and processing communication signals sent by another device. The receiver can have a receiving capability 215. The receiving capability 215 is ability for a device for detecting and processing an amount of communication signal, a type of communication signal, or a combination thereof. The receiving capability 215 can be based on components of the receiver.

For example, the receiving capability 215 can be associated with the receiver-antenna count 206. The receiving capability 215 can be limited to have the receiver-antenna count 206 as a maximum number of layers the receiver can simultaneously detect and process. The receiving capability 215 can further exceed the receiver-antenna count 206. Also for example, the receiving capability 215 can be associated with the receiver itself, such as for an advance receiver 216.

The advance receiver 216 is a device capable of processing both intended signal information and interference signal information. The advance receiver 216 can be an interference-aware device, including a detector, a demodulator, a decoder, or a combination thereof, that can determine both the interference content 113 of FIG. 1 and the communication content 109 from the receiver signal 118. For example, the advance receiver 216 can include a joint-detector-decoder, successive interference determination device, or a combination thereof.

For example, in the communication system 100 having two antennas on both the base station 106 and the mobile device 102 for a '2-by-2' system, the advance receiver 216 can process the signal layer data 210 and the further layer data 212 to determine the communication content 109. The advance receiver 216 can also process one or more instances of the interference signal 114 of FIG. 1 from the receiver signal 118 to determine the interference content 113.

The communication system 100 can determine the communication content 109, the interference content 113, or a combination thereof for an under-determined system conditions when the transmitter-antenna count 204 is greater than the receiver-antenna count 206. The communication system 100 can identify data corresponding to one or more layers, according to the difference between the transmitter-antenna count 204 and the receiver-antenna count 206, as instances of the further layer data 212 instead of or in place of the interference content 113.

For example, in the communication system 100 having four antennas on the base station 106 and two antennas on the mobile device 102 for a '4-by-2' system, the advance receiver 216 can process the signal layer data 210 and three independent instances of the further layer data 212 to determine the communication content 109. The communication system 100 can determine the three independent instances of the further layer data 212 using methods or processes similar to ones for determining the interference content 113 in the '2-by-2' system with adjustments to determine the communication content 109.

It has been discovered that the use of the advance receiver 216 when the transmitter-antenna count 204 is greater than the receiver-antenna count 206 maximizes throughput. The advance receiver 216 can identify one or more layers as the further layer data 212 instead of the interference content 113 and adjust further processing to determine the communication content 109. The additional number of antennas on the transmitting device can be used to communicate additional information than restricting the number antennas used on the transmitting device to equal the number of antennas on the receiving device. Details regarding the determination of the communication content 109 in the under-determined system using the advance receiver 216 will be discussed below.

The communication system 100 can include an advance receiver notification 218. The advance receiver notification 218 is information regarding presence or identification of the advance receiver 216. For example, the advance receiver notification 218 can be a message or a status indicating that the advance receiver 216 is available for receiving and processing signals. Also for example, the advance receiver notification 218 can be a category, a type, a serial number, a manufacturer identification, a version number, or a combination thereof used to identify the advance receiver 216.

The communication system 100 can transmit at a full-rank transmission mode 220 based on the advance receiver notification 218. The full-rank transmission mode 220 is a configuration or setting for a device or a process of steps that utilizes all available applicable antennas in transmitting signals to a device. For example, the full-rank transmission mode 220 can have the base station 106 transmit the transmitter signal 108 using all antennas as indicated by the transmitter-antenna count 204.

The communication system 100 can transmit at the full-rank transmission mode 220 regardless of the receiver-antenna count 206. Details regarding the full-rank transmission mode 220 relative to the receiver-antenna count 206 will be discussed below.

For illustrative purposes, the communication system 100 will be described as a multiple-input and multiple-output (MIMO) system and as having the under-determined system condition for the '4-by-2' system. However, it is understood that the communication system 100 can be different.

For example, the communication system 100 can be a single-input and single-output (SISO) system. Also for example, the communication system 100 can have various combinations of transmitting and receiving antennas, including having equal number of transmitting and receiving antennas or having more antennas on the mobile station 102 than the number of transmitting antennas on the base station 106. As a further example, the mobile station 102 can transmit the transmitter signal 108 and the base station 106 can receive a corresponding instance of the receiver signal 108.

Figure 3:
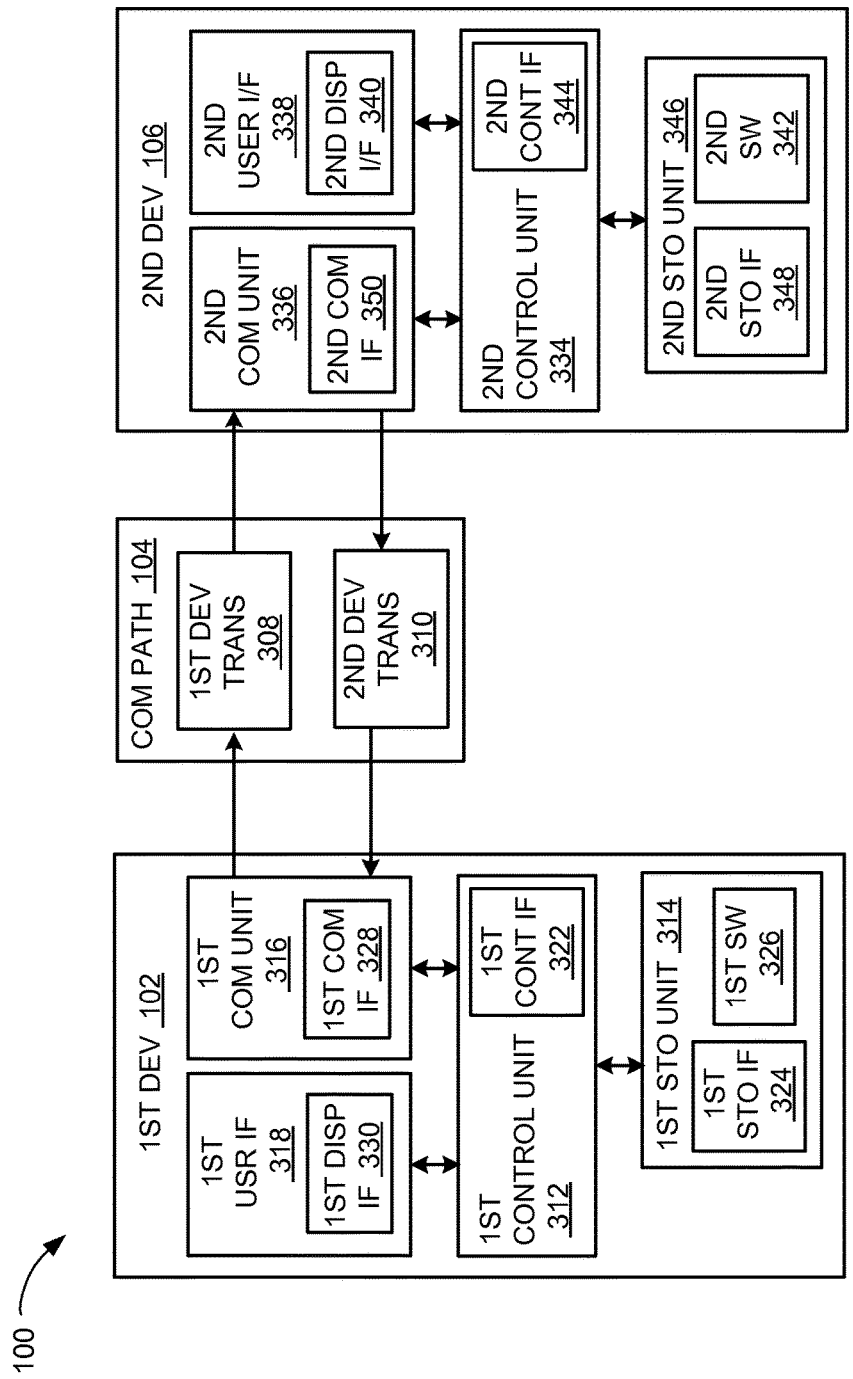
FIG. 3 is an exemplary block diagram of the communication system.

Referring now to FIG. 3, therein is shown an exemplary block diagram of the communication system 100. The communication system 100 can include the first device 102, the communication path 104, and the second device 106. The first device 102 can send information in a first device transmission 308 over the communication path 104 to the second device 106. The second device 106 can send information in a second device transmission 310 over the communication path 104 to the first device 102.

For illustrative purposes, the communication system 100 is shown with the first device 102 as a client device, although it is understood that the communication system 100 can have the first device 102 as a different type of device. For example, the first device 102 can be a server having a display interface.

Also for illustrative purposes, the communication system 100 is shown with the second device 106 as a server, although it is understood that the communication system 100 can have the second device 106 as a different type of device. For example, the second device 106 can be a client device.

For brevity of description in this embodiment of the present invention, the first device 102 will be described as a client device and the second device 106 will be described as a server device. The embodiment of the present invention is not limited to this selection for the type of devices. The selection is an example of an embodiment of the present invention.

The first device 102 can include a first control unit 312, a first storage unit 314, a first communication unit 316, and a first user interface 318. The first control unit 312 can include a first control interface 322. The first control unit 312 can execute a first software 326 to provide the intelligence of the communication system 100.

The first control unit 312 can be implemented in a number of different manners. For example, the first control unit 312 can be a processor, an application specific integrated circuit (ASIC) an embedded processor, a microprocessor, a hardware control logic, a hardware finite state machine (FSM), a digital signal processor (DSP), or a combination thereof. The first control interface 322 can be used for communication between the first control unit 312 and other functional units in the first device 102. The first control interface 322 can also be used for communication that is external to the first device 102.

The first control interface 322 can receive information from the other functional units or from external sources, or can transmit information to the other functional units or to external destinations. The external sources and the external destinations refer to sources and destinations external to the first device 102.

The first control interface 322 can be implemented in different ways and can include different implementations depending on which functional units or external units are being interfaced with the first control interface 322. For example, the first control interface 322 can be implemented with a pressure sensor, an inertial sensor, a microelectromechanical system (MEMS), optical circuitry, waveguides, wireless circuitry, wireline circuitry, or a combination thereof.

The first storage unit 314 can store the first software 326. The first storage unit 314 can also store the relevant information, such as data representing incoming images, data representing previously presented image, sound files, or a combination thereof.

The first storage unit 314 can be a volatile memory, a nonvolatile memory, an internal memory, an external memory, or a combination thereof. For example, the first storage unit 314 can be a nonvolatile storage such as non-volatile random access memory (NVRAM), Flash memory, disk storage, or a volatile storage such as static random access memory (SRAM).

The first storage unit 314 can include a first storage interface 324. The first storage interface 324 can be used for communication between and other functional units in the first device 102. The first storage interface 324 can also be used for communication that is external to the first device 102.

The first storage interface 324 can receive information from the other functional units or from external sources, or can transmit information to the other functional units or to external destinations. The external sources and the external destinations refer to sources and destinations external to the first device 102.

The first storage interface 324 can include different implementations depending on which functional units or external units are being interfaced with the first storage unit 314. The first storage interface 324 can be implemented with technologies and techniques similar to the implementation of the first control interface 322.

The first communication unit 316 can enable external communication to and from the first device 102. For example, the first communication unit 316 can permit the first device 102 to communicate with the second device 106 of FIG. 1, an attachment, such as a peripheral device or a computer desktop, and the communication path 104.

The first communication unit 316 can also function as a communication hub allowing the first device 102 to function as part of the communication path 104 and not limited to be an end point or terminal unit to the communication path 104. The first communication unit 316 can include active and passive components, such as microelectronics or an antenna, for interaction with the communication path 104.

The first communication unit 316 can include a first communication interface 328. The first communication interface 328 can be used for communication between the first communication unit 316 and other functional units in the first device 102. The first communication interface 328 can receive information from the other functional units or can transmit information to the other functional units.

The first communication interface 328 can include different implementations depending on which functional units are being interfaced with the first communication unit 316. The first communication interface 328 can be implemented with technologies and techniques similar to the implementation of the first control interface 322.

The first user interface 318 allows a user (not shown) to interface and interact with the first device 102. The first user interface 318 can include an input device and an output device. Examples of the input device of the first user interface 318 can include a keypad, a touchpad, soft-keys, a keyboard, a microphone, an infrared sensor for receiving remote signals, or any combination thereof to provide data and communication inputs.

The first user interface 318 can include a first display interface 330. The first display interface 330 can include a display, a projector, a video screen, a speaker, or any combination thereof.

The first control unit 312 can operate the first user interface 318 to display information generated by the communication system 100. The first control unit 312 can also execute the first software 326 for the other functions of the communication system 100. The first control unit 312 can further execute the first software 326 for interaction with the communication path 104 via the first communication unit 316.

The second device 106 can be optimized for implementing an embodiment of the present invention in a multiple device embodiment with the first device 102. The second device 106 can provide the additional or higher performance processing power compared to the first device 102. The second device 106 can include a second control unit 334, a second communication unit 336, and a second user interface 338.

The second user interface 338 allows a user (not shown) to interface and interact with the second device 106. The second user interface 338 can include an input device and an output device. Examples of the input device of the second user interface 338 can include a keypad, a touchpad, soft-keys, a keyboard, a microphone, or any combination thereof to provide data and communication inputs. Examples of the output device of the second user interface 338 can include a second display interface 340. The second display interface 340 can include a display, a projector, a video screen, a speaker, or any combination thereof.

The second control unit 334 can execute a second software 342 to provide the intelligence of the second device 106 of the communication system 100. The second software 342 can operate in conjunction with the first software 326. The second control unit 334 can provide additional performance compared to the first control unit 312.

The second control unit 334 can operate the second user interface 338 to display information. The second control unit 334 can also execute the second software 342 for the other functions of the communication system 100, including operating the second communication unit 336 to communicate with the first device 102 over the communication path 104.

The second control unit 334 can be implemented in a number of different manners. For example, the second control unit 334 can be a processor, an embedded processor, a microprocessor, hardware control logic, a hardware finite state machine (FSM), a digital signal processor (DSP), or a combination thereof.

The second control unit 334 can include a second control interface 344. The second control interface 344 can be used for communication between the second control unit 334 and other functional units in the second device 106. The second control interface 344 can also be used for communication that is external to the second device 106.

The second control interface 344 can receive information from the other functional units or from external sources, or can transmit information to the other functional units or to external destinations. The external sources and the external destinations refer to sources and destinations external to the second device 106.

The second control interface 344 can be implemented in different ways and can include different implementations depending on which functional units or external units are being interfaced with the second control interface 344. For example, the second control interface 344 can be implemented with a pressure sensor, an inertial sensor, a microelectromechanical system (MEMS), optical circuitry, waveguides, wireless circuitry, wireline circuitry, or a combination thereof.

A second storage unit 346 can store the second software 342. The second storage unit 346 can also store the such as data representing incoming images, data representing previously presented image, sound files, or a combination thereof. The second storage unit 346 can be sized to provide the additional storage capacity to supplement the first storage unit 314.

For illustrative purposes, the second storage unit 346 is shown as a single element, although it is understood that the second storage unit 346 can be a distribution of storage elements. Also for illustrative purposes, the communication system 100 is shown with the second storage unit 346 as a single hierarchy storage system, although it is understood that the communication system 100 can have the second storage unit 346 in a different configuration. For example, the second storage unit 346 can be formed with different storage technologies forming a memory hierarchal system including different levels of caching, main memory, rotating media, or off-line storage.

The second storage unit 346 can be a volatile memory, a nonvolatile memory, an internal memory, an external memory, or a combination thereof. For example, the second storage unit 346 can be a nonvolatile storage such as non-volatile random access memory (NVRAM), Flash memory, disk storage, or a volatile storage such as static random access memory (SRAM).

The second storage unit 346 can include a second storage interface 348. The second storage interface 348 can be used for communication between other functional units in the second device 106. The second storage interface 348 can also be used for communication that is external to the second device 106.

The second storage interface 348 can receive information from the other functional units or from external sources, or can transmit information to the other functional units or to external destinations. The external sources and the external destinations refer to sources and destinations external to the second device 106.

The second storage interface 348 can include different implementations depending on which functional units or external units are being interfaced with the second storage unit 346. The second storage interface 348 can be implemented with technologies and techniques similar to the implementation of the second control interface 344.

The second communication unit 336 can enable external communication to and from the second device 106. For example, the second communication unit 336 can permit the second device 106 to communicate with the first device 102 over the communication path 104.

The second communication unit 336 can also function as a communication hub allowing the second device 106 to function as part of the communication path 104 and not limited to be an end point or terminal unit to the communication path 104. The second communication unit 336 can include active and passive components, such as microelectronics or an antenna, for interaction with the communication path 104.

The second communication unit 336 can include a second communication interface 350. The second communication interface 350 can be used for communication between the second communication unit 336 and other functional units in the second device 106. The second communication interface 350 can receive information from the other functional units or can transmit information to the other functional units.

The second communication interface 350 can include different implementations depending on which functional units are being interfaced with the second communication unit 336. The second communication interface 350 can be implemented with technologies and techniques similar to the implementation of the second control interface 344.

The first communication unit 316 can couple with the communication path 104 to send information to the second device 106 in the first device transmission 308. The second device 106 can receive information in the second communication unit 336 from the first device transmission 308 of the communication path 104.

The second communication unit 336 can couple with the communication path 104 to send information to the first device 102 in the second device transmission 310. The first device 102 can receive information in the first communication unit 316 from the second device transmission 310 of the communication path 104. The communication system 100 can be executed by the first control unit 312, the second control unit 334, or a combination thereof. For illustrative purposes, the second device 106 is shown with the partition having the second user interface 338, the second storage unit 346, the second control unit 334, and the second communication unit 336, although it is understood that the second device 106 can have a different partition. For example, the second software 342 can be partitioned differently such that some or all of its function can be in the second control unit 334 and the second communication unit 336. Also, the second device 106 can include other functional units not shown in FIG. 3 for clarity.

The functional units in the first device 102 can work individually and independently of the other functional units. The first device 102 can work individually and independently from the second device 106 and the communication path 104.

The functional units in the second device 106 can work individually and independently of the other functional units. The second device 106 can work individually and independently from the first device 102 and the communication path 104.

For illustrative purposes, the communication system 100 is described by operation of the first device 102 and the second device 106. It is understood that the first device 102 and the second device 106 can operate any of the modules and functions of the communication system 100.

Figure 4:
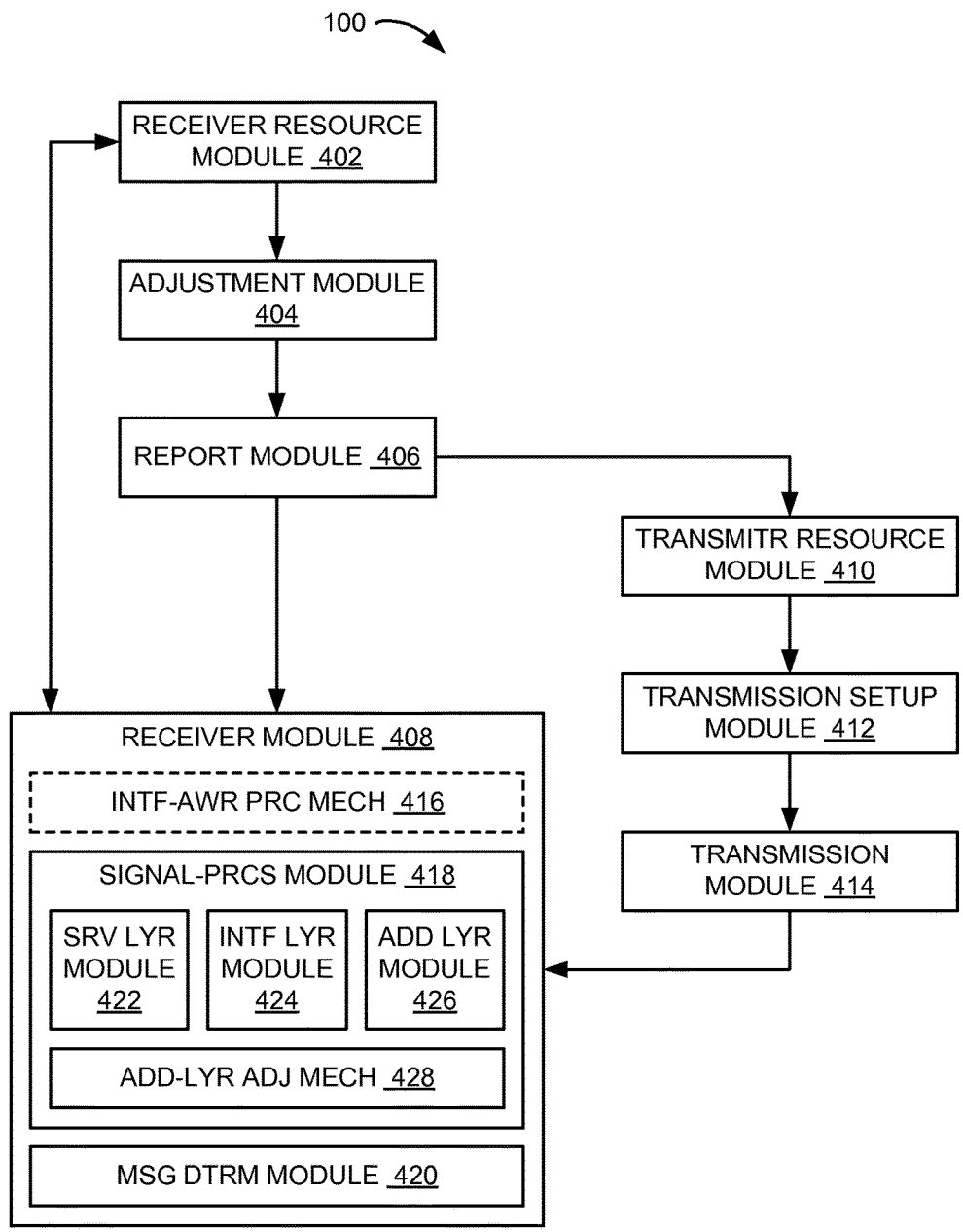
FIG. 4 is a control flow of the communication system.

Referring now to FIG. 4, therein is shown a control flow of the communication system 100. The communication system 100 can include a receiver resource module 402, an adjustment module 404, a report module 406, a receiver module 408, a transmitter resource module 410, a transmission setup module 412, and a transmission module 414.

The receiver resource module 402 can be coupled to the adjustment module 404, with the adjustment module 404 further coupled to the report module 406. The report module 406 can be coupled to the receiver module 408 and the transmitter resource module 410. The transmitter resource module 410 can be coupled to the transmission setup module 412, with the transmission setup module 412 further coupled to the transmission module 414. The transmission module 414 can be further coupled to the receiver module 408.

The modules can be coupled to each other in a variety of ways. For example, one or more outputs from one module, such as the receiver resource module 402 or the transmission setup module 412, can be connected to one or more inputs of another module, such as the adjustment module 404 or the transmission module 414. Also for example, one or more outputs from one module, such as the report module 406 or the transmission module 414, can be connected to one or more inputs of another module, such as the transmitter resource module 410 or the receiver module 408, through the network 104 of FIG. 1, the transmitter channel 110 of FIG. 1, or a combination thereof.

The receiver resource module 402 is configured to determine capabilities of a device in receiving communication signals. For example, the receiver resource module 402 can identify components or software features in the mobile device 102 of FIG. 1, the base station 106 of FIG. 1, or a combination thereof used for receiving and processing communication signals.

As a more specific example, the receiver resource module 402 can determine the receiver-antenna count 206 of FIG. 2 for characterizing the mobile device 102, the base station 106, or a combination thereof. The receiver resource module 402 can determine the receiver-antenna count 206 by using the first communication unit 316 of FIG. 3, the second communication unit 336 of FIG. 3, the first control unit 312 of FIG. 3, the second control unit 334 of FIG. 3, or a combination thereof to access information regarding physical specifications designated for receiving signals, including a number of antennas, stored in the first storage unit 314 of FIG. 3, the second storage unit 346 of FIG. 3, or a combination thereof.

The receiver resource module 402 can also determine the receiver-antenna count 206 using circuits, such as number of paths or ports. The receiver resource module 402 can further determined the receiver-antenna count 206 as the maximum amount of information, such as symbols or independent data streams that can be simultaneously received.

As a further example, the receiver resource module 402 can determine the advance receiver 216 of FIG. 2 in the communication system 100. The receiver resource module 402 can use the first control interface 322 of FIG. 3, the second control interface 344 of FIG. 3, or a combination thereof to access identification information regarding various components in the communication system 100. The receiver resource module 402 can compare the identification information to a list or a deciphering method predetermined by the communication system 100 to identify one or more of the component as the advance receiver 216.

The receiver resource module 402 can further query the receiver module 408 to determine if the receiver module 408 includes an interference-aware processing mechanism 416. The receiver resource module 402 can determine the presence of the advance receiver 216 for the receiver module 408 including the interference-aware processing mechanism 416.

The interference-aware processing mechanism 416 is a method, a configuration, or a set of instructions for determining and utilizing a portion in the receiver signal 118 of FIG. 1 corresponding to the transmitter signal 108 of FIG. 1 as well as a portion in the receiver signal 118 corresponding to the interference signal 114 of FIG. 1. The interference-aware processing mechanism 416 can have the communication system 100 or a portion therein determine, estimate, calculate, or a combination thereof for the communication data 109 of FIG. 1, the serving channel estimate 120 of FIG. 1, or a combination thereof and the interference content 113 of FIG. 1, the interference channel estimate 122 of FIG. 1, or a combination thereof. Details regarding the use of the interference-aware processing mechanism 416 will be described below After determining signal receiving capabilities, the control flow can be passed from the receiver resource module 402 to the adjustment module 404. The control flow can be passed by having processing results of the receiver resource module 402, such as the receiver-antenna count 206 or status regarding the advance receiver 216, pass from the receiver resource module 402 as input to the adjustment module 404, by storing the processing results at a location known and accessible to the adjustment module 404, by notifying the adjustment module 404, such as by using a flag, an interrupt, a status signal, or a combination, or a combination of processes thereof.

The adjustment module 404 is configured to generate the receiver-capacity profile 208 of FIG. 2 for communicating between the base station 106 and the mobile device 102. The adjustment module 404 can generate the receiver-capacity profile 208 based on the receiver-antenna count 206, the interference-aware processing mechanism 416, the status of the advance receiver 216, or a combination thereof.

For example, the adjustment module 404 can generate the receiver-capacity profile 208 to include a number corresponding to the receiver-antenna count 206 or a number exceeding the receiver-antenna count 206. The adjustment module 404 can generate the receiver-capacity profile 208 exceeding a capability associated with the receiver-antenna count 206 when the communication system 100 includes the advance receiver 216. As a more specific example, the adjustment module 404 can generate the receiver-capacity profile 208 for reporting a number of antennas greater than the receiver-antenna count 206.

Also for example, the adjustment module 404 can generate the receiver-capacity profile 208 to include the advance receiver notification 218 of FIG. 2. The adjustment module 404 can generate the receiver-capacity profile 208 to include the advance receiver notification 218 when the communication system 100 includes the interference-aware processing mechanism 416.

It has been discovered that the receiver-capacity profile 208 indicating a number exceeding the receiver-antenna count 206 when the communication system 100 includes the advance receiver 216 provides increased throughput for the communication system 100. The receiver-capacity profile 208 indicating a number exceeding the receiver-antenna count 206 can be used to fully utilize the advance receiver 216 in processing a number of layers exceeding the receiver-antenna count 206. The increased layers can correspond to increase in communicated data, which can lead to the increased throughput, in comparison to a normal operation of receiver-capacity profile 208 indicating a number less than or equal to the receiver-antenna count 206 and communicating through corresponding amount of layers.

It has also been discovered that the receiver-capacity profile 208 including the advance receiver notification 218 provides increased efficiency and maximization of available resources for the communication system 100. The receiver-capacity profile 208 including the advance receiver notification 218 can remove a previous limitation on resources for the transmitting device tied to the receiver-antenna count 206 based on the availability of the advance receiver 216. The communication system 100 can increase the resources at the transmitting device dedicated for communication when the advance receiver notification 218, which can increase the efficiency and maximize the available resources beyond the limitation of the receiver-antenna count 206.

The adjustment module 404 can use the first communication unit 316, the second communication unit 336, the first control unit 312, the second control unit 334, or a combination thereof to generate the receiver-capacity profile 208. The adjustment module 404 can store the receiver-capacity profile 208 in the first storage unit 314, the second storage unit 346, or a combination thereof.

After generating the receiver-capacity profile 208, the control flow can pass from the adjustment module 404 to the report module 406. The control flow can pass similarly as described above between the receiver resource module 402 and the adjustment module 404 but using processing results of the adjustment module 404 instead of results of the receiver resource module 402.

The report module 406 is configured to transmit the receiver-capacity profile 208. The report module 406 can use the first communication unit 316, the second communication unit 336, or a combination thereof to transmit the receiver-capacity profile 208. The report module 406 can transmit the receiver-capacity profile 208 according to a protocol or a method predetermined by the communication system 100 or a standard. The report module 406 can transmit the receiver-capacity profile 208 for communicating the communication content 109 of FIG. 1 between the base station 106 and the mobile device 102.

As described above, the report module 406 can transmit the receiver-capacity profile 208 indicating a number of antennas exceeding the receiver-antenna count 206. The report module 406 can also transmit the receiver-capacity profile 208 including the advance receiver notification 218.

After transmitting the receiver-capacity profile 208, the control flow can pass from the report module 406 to the receiver module 408, the transmitter resource module 410, or a combination thereof. The control flow can pass similarly as described above between the receiver resource module 402 and the adjustment module 404 but for using processing results of the report module 406, such as a status for transmission or reception, instead of results of the receiver resource module 402.

The receiver module 408 is configured to receive and process communication signals. The receiver module 408 can receive and process the receiver signal 118.

The receiver module 408 can be executing in parallel to the transmitter resource module 410. For example, the receiver module 408 can look for the receiver signal 118 having the transmitter content 109 therein in response to the receiver-capacity profile 208. As a more specific example, the mobile device 102 can look for transmitted data from the base station 106 after reporting the receiver-capacity profile to the base station 106. Details regarding the receiver module 408 will be described below.

The transmitter resource module 410 is configured to determine capabilities of a device in transmitting communication signals. The transmitter resource module 410 can be similar to the receiver resource module 402 but for being applied to transmitting signals instead of receiving signals. For example, the transmitter resource module 410 can identify components or software features in the mobile device 102, the base station 106, or a combination thereof used for transmitting communication signals.

As a more specific example, the transmitter resource module 410 can determine the transmitter-antenna count 204 of FIG. 1 for characterizing the mobile device 102, the base station 106, or a combination thereof. The transmitter-antenna count 204 can be equal to, less than, or greater than the receiver-antenna count 206. The transmitter-antenna count 204 and the receiver-antenna count 206 can be related to each other, such as transmitting and receiving through the same set of antennas, or can be independent of each other, such as having different sets of antennas for transmitting and receiving.

Also for example, the transmitter resource module 410 can access information regarding physical specifications designated for transmitting signals, including a number of antennas, stored therein. For further example, the transmitter resource module 410 can use circuitry, maximum amount of information that can be simultaneously received, or a combination thereof to determine the transmitter-antenna count 204.

In some example embodiments, the transmitter resource module 410 can be configured to receive the receiver-capacity profile 208. The transmitter resource module 410 can use the first communication unit 316, the second communication unit 336, or a combination thereof to detect, decode, process, or a combination thereof for the receiver-capacity profile 208. For example, the transmitter resource module 410 on the base station 106 can use signal receiving functions and capabilities to receive the receiver-capacity profile 208 transmitted by the mobile device 102.

After determining signal transmitting capabilities, the control flow can be passed from the transmitter resource module 410 to the transmission setup module 412. The control flow can be passed similarly as described above between the receiver resource module 402 and the adjustment module 404 but using processing results of the transmitter resource module 410 instead of results of the receiver resource module 402.

The transmission setup module 412 is configured to control resources used for communicating between devices. The transmission setup module 412 can use the first control interface 322, the second control interface 334, or a combination thereof for controlling communication resources. For example, the transmission setup module 412 can control the number of antennas used for transmitting signals. Also for example, the transmission setup module 412 can control the number of antennas on the transmitting device, such as the base station 106, to be used for transmitting the transmitter signal 108.

The transmission setup module 412 can limit the number of antennas being used to transmit the transmitter signal 108 and thereby control a number of layers being used to transmit the transmitter signal 108. The transmission setup module 412 can use the number of transmission antennas to be equal to or less than the receiver-antenna count 206 as indicated by the receiver-capacity profile 208.

Alternatively, the transmission setup module 412 can set the full-rank transmission mode 220 of FIG. 2 for all instances of the antennas corresponding to the transmitter-antenna count 204. The transmission setup module 412 can set the full-rank transmission mode 220 by allowing the transmitter signal 108 to be transmitted using all instances of the antennas indicated as being available by the transmitter-antenna count 204. The transmission setup module 412 can set the full-rank transmission mode 220 based on the advance receiver notification 218, or the presence of the advance receiver 216 in the communication system 100.

The transmission setup module 412 can also ignore the receiver-antenna count 206 indicated by the receiver-capacity profile 208 and set the full-rank transmission mode 220. The transmission setup module 412 can further set the full-rank transmission mode 220 without receiving the receiver-capacity profile 208. For example, when the communication system 100 knows that the advance receiver 216 is being used to receive and process the signals, such as by standardization or according to usage data, the transmission setup module 412 can set the full-rank transmission mode 220 regardless of the receiver-capacity profile 208.

The transmission setup module 412 can further set the number of transmission antennas to be between that of the full-rank transmission mode 220 and the receiver-antenna count 206. For example, the transmission setup module 412 can perform a cost-benefit type of analysis for all available antennas and a size of the communication task.

Continuing with the example, the transmission setup module 412 can set the number of transmission antennas to be less than that of the full-rank transmission mode 220 but greater than the receiver-antenna count 206. The transmission setup module 412 can allocate the non-used antenna from within originally determined instance of the transmitter-antenna count 204 for other communications to maximize the overall cost-benefit and throughput for the device.

After controlling allocation of communication resources, the control flow can pass from the transmission setup module 412 to the transmission module 414. The control flow can pass similarly as described above between the receiver resource module 402 and the adjustment module 404 but using processing results of the transmission setup module 412, such as a configuration status or profile, instead of results of the receiver resource module 402.

The transmission module 414 is configured to transmit the transmitter signal 108. The transmission module 414 can transmit the transmitter signal 108 using the resources allocated by the transmission setup module 412. For example, the transmission module 414 can transmit the transmitter signal 108 using the first communication unit 316, the second communication unit 336, or a combination thereof using a number of antennas greater than the receiver-antenna count 206, according to the full-rank transmission mode 220, the regardless of the receiver-capacity profile 208, or a combination thereof.

The transmitter signal 108 can experience changes due to the transmitter channel 110 of FIG. 1. The transmitter signal 108 can also be added with the interference signal 114 of FIG. 1 when arriving at the receiving device to form the receiver signal 108.

The receiver module 408 can receive and process the receiver signal 118 corresponding to the transmitter signal 108 for communicating between the base station 106 and the mobile device 102. The receiver module 408 can also receive and process the receiver signal 118 associated with the transmitter signal 108 transmitted using a number of layers greater than the receiver-antenna count 206 indicated by the receiver-capacity profile 208. The receiver module 408 can include the interference-aware processing mechanism 416 as described above for receiving and processing the receiver signal 118.

The receiver module 408 can determine the communication content 109 from the receiver signal 118. The receiver module 408 can use interference-aware processing mechanism 416 and determine the interference content 113, the serving channel estimate 120, the interference channel estimate 122, the signal layer data 210 of FIG. 2, the further layer data 212 of FIG. 2, or a combination thereof for determining the communication content 109.

The receiver module 408 having the interference-aware processing mechanism 416 can use a variety of methods to determine the interference content 113 instead of processing the interference content 113, the interference channel estimate 122, or a combination thereof as part of the serving channel estimate 120. For example, the receiver module 408 having the interference-aware processing mechanism 416 can include an interference-aware detector, an interference-aware decoder, an iterative or joint detector-decoder architecture, a successive interference determining architecture, or a combination thereof.

The receiver module 408 can include a signal-processing module 418 and a message determination module 420 for receiving and processing the receiver signal 118. The signal-processing module 418 is configured to receive the receiver signal 118.

The signal-processing module 418 can receive the receiver signal 118 by analyzing electro-magnetic changes or signals corresponding to a frequency, a phase, a code, a time slot, or a combination thereof. The signal-processing module 418 can receive the receiver signal 118 by capturing the information, such as voltage levels, corresponding to the frequency, the phase, the code, the time slot, or a combination thereof specified for communication according to the communication system 100.

The signal-processing module 418 can further process the receiver signal 118. For example, the signal-processing module 418 can detect, decode, or a combination thereof for the receiver signal 118. The signal-processing module 418 can include a serving layer module 422, an interference layer module 424, and an additional layer module 426.

The serving layer module 422 is configured to determine the signal layer data 210. The serving layer module 422 can also determine the signal layer data 210 from the receiver signal 118 transmitted in association with the receiver-capacity profile 208 or the receiver-antenna count 206.

The serving layer module 422 can perform detection, decoding, or a combination of processes thereof either independently or in combination with other modules, such as the interference layer module 424, the additional layer module 426, the message determination module 420, or a combination thereof, to determine the signal layer data 210. The serving layer module 422 can determine the signal layer data 210 using a variety of methods for utilizing the interference-aware processing mechanism 416.

For example, the serving layer module 422 can calculate likelihood values for a portion of the receiver signal 118 corresponds to one or more symbols or bits and use the likelihood values to determine the signal layer data 210. As a more specific example, the serving layer module 422 can calculate logarithmic likelihood ratio (LLR) values that the portion of the receiver signal 118 corresponds to a specific instance of a symbol within a constellation or a specific bit given the receiver signal 118. The serving layer module 422 can further use an a-priori value for previously known values, as calculated on a previous iteration, by a different module, such as the interference layer module 424 or the message determination module 420, or a combination thereof.

Continuing with the example, the serving layer module 422 can also calculate an a-posteriori value for calculated or later determined values according to one or more methods predetermined by the communication system 100 based on the receiver signal 118 or a portion therein. The serving layer module 422 can further calculate an extrinsic value as new information that is not derived from received information according to one or more methods predetermined by the communication system 100 based on the receiver signal 118 or a portion therein.

Also for example, the serving layer module 422 can utilize a maximum-likelihood mechanism, maximum a-posteriori (MAP) or Bayesian mechanism, minimum mean square error mechanism, a derivation thereof, or a combination thereof to determine the signal layer data 210. The serving layer module 422 can utilize a non-interference cancelling mechanism, such that detection, decoding, determination, or a combination thereof for the signal layer data 210 can be done without cancelling the further layer data 212, the interference content 113, or a combination thereof.

The serving layer module 422 can use the first communication unit 316, the second communication unit 336, the first control unit 312, the second control unit 334, or a combination thereof to determine the signal layer data 210. The serving layer module 422 can store the signal layer data 210, an intermediate product calculated in determining the signal layer data 210, such as an LLR value, or a combination thereof in the first storage unit 314, the second storage unit 346, or a combination thereof.

The interference layer module 424 is configured to determine the interference content 113. The interference layer module 424 can also determine the interference content 113 associated with one or more layers corresponding to a difference between the receiver-antenna count 206 and the receiver-capacity profile 208.

The interference layer module 424 can perform detection, decoding, or a combination of processes thereof either independently or in combination with other modules, such as the serving layer module 422, the additional layer module 426, the message determination module 420, or a combination thereof, to determine the interference content 113. The interference layer module 424 can determine the interference content 113 using a variety of methods for utilizing the interference-aware processing mechanism 416.

For example, the interference layer module 424 can further determine the interference content 113 as a difference between the receiver signal 118 and the signal layer data 210. Also for example, the interference layer module 424 can determine the interference content 113 using likelihood based calculations, various mechanisms, or a combination thereof, as described above for the serving layer module 422.

The interference layer module 424 can determine the interference content 113 based on or independent of the determination of the signal layer data 210. The interference layer module 424 can also utilize a non-interference cancelling mechanism, such that detection, decoding, determination, or a combination thereof for the interference content 113 can be done without cancelling the further layer data 212, the signal layer data 210, or a combination thereof.

The interference layer module 424 can use the first communication unit 316, the second communication unit 336, the first control unit 312, the second control unit 334, or a combination thereof to determine the interference content 113. The interference layer module 424 can store the interference content 113, an intermediate product calculated in determining the interference content 113, such as an LLR value, or a combination thereof in the first storage unit 314, the second storage unit 346, or a combination thereof.

The signal-processing module 418 can include an additional-layer adjustment mechanism 428. The additional-layer adjustment mechanism 428 is a set of methods, configurations, adjustment, or a combination thereof for accommodating processing for the further layer data 212.

For example, the serving layer module 422 can determine the signal layer data 210 for one or more layers corresponding to the receiver-antenna count 206, and the interference layer module 424 can determine an intermediate instance of the interference content 113 to include remaining portion of the receiver signal 118, including the further layer data 212. The additional-layer adjustment mechanism 428 can be a signal, a set of instructions or steps, or a combination thereof for enabling the additional layer module 426 to determine the further layer data 212 from the interference content 113 corresponding to one or more layers exceeding the receiver-antenna count 206.

Also for example, the additional-layer adjustment mechanism 428 can be a set of instructions or steps for determining the signal layer data 210, the further layer data 212, and the interference content 113 independent of each other, simultaneously, iteratively, or a combination thereof. As a more specific example, the interference layer module 424 can calculate the interference content 113 without calculating the intermediate instance of the interference content 113 including the further layer data 212.

Continuing with the example, the additional layer module 426 can determine the further layer data 212 directly from the receiver signal 118, using the signal layer data 210, using the interference content 113, or a combination thereof. The additional-layer adjustment mechanism 428 can be implemented across the serving layer module 422, the interference layer module 424, and the additional layer module 426. The modules can determine the outputs independent of each other, have intermediate results iteratively shared between modules for simultaneously determining the outputs, or iteratively execute the individual modules and use the output determination of one module to determine the output of another module.

The additional layer module 426 is configured to determine the further layer data 212. The additional layer module 426 can utilize the additional-layer adjustment mechanism 428 to determine the further layer data 212. The additional layer module 426 can determine the further layer data 212 directly from the receiver signal 118, from the intermediate instance of the interference content 113, or a combination thereof.

For example, the additional layer module 426 can determine the further layer data 212 associated with the one or more layers corresponding to the difference between the receiver-antenna count 206 and the receiver-capacity profile 208. The additional layer module 426 can determine the further layer data 212 for layers exceeding the receiver-antenna count 206, for data corresponding to the communication content 109, transmitted from the base station 106 and not the interference source 112 of FIG. 1, or a combination thereof.

Also for example, the additional layer module 426 can determine the further layer data 212 from the intermediate instance of the interference content 113 determined by the interference layer module 424. The additional layer module 426 can separate the further layer data 212 and the interference content 113 transmitted by the interference source 112 from the intermediate instance determined by the interference layer module 424.

The additional layer module 426 can be similar to the serving layer module 422, the interference layer module 424, or a combination thereof. The additional layer module 426 can also perform detection, decoding, or a combination of processes thereof either independently or in combination with other modules, such as the serving layer module 422, the interference layer module 424, the message determination module 420, or a combination thereof, to determine the further layer data 212. Further, the additional layer module 426 can determine the further layer data 212 using a variety of methods for utilizing the interference-aware processing mechanism 416.

For example, the additional layer module 426 can further determine the further layer data 212 as a difference between the receiver signal 118, the signal layer data 210, and the interference content 113 or between the intermediate instance of the interference content 113 and the actual instance of the interference content 113. Also for example, the additional layer module 426 can determine the signal layer data 210 using likelihood based calculations, various mechanisms, or a combination thereof, as described above for the serving layer module 422.

The additional layer module 426 can determine the further layer data 212 based on or independent of the determination of the signal layer data 210, the interference content 113, or a combination thereof. The additional layer module 426 can also utilize a non-interference cancelling mechanism, such that detection, decoding, determination, or a combination thereof for the further layer data 212 can be done without cancelling the signal layer data 210, the interference content 113, or a combination thereof.

It has been discovered that the additional layer module 426 using the additional-layer adjustment mechanism 428 provides increase throughput and versatility for the communication system 100. The additional-layer adjustment mechanism 428 can enable the communication system 100 to utilize a number of layers that are less than, equal to, or greater than the receiver-antenna count 206 without using multiple instances of the receiver module 408. The additional-layer adjustment mechanism 428 can be used to switch between processing for conditions where the transmitter signal uses the number of layers corresponding to the receiver-antenna count 206 or less and where the transmitter signal uses the number of layers exceeding to the receiver-antenna count 206.

The additional layer module 426 can use the first communication unit 316, the second communication unit 336, the first control unit 312, the second control unit 334, or a combination thereof to determine the further layer data 212. The additional layer module 426 can store the further layer data 212, an intermediate product calculated in determining the further layer data 212, such as an LLR value, or a combination thereof in the first storage unit 314, the second storage unit 346, or a combination thereof.

The message determination module 420 is configured to determine the communication content 109 from the receiver signal 118. The message determination module 420 can determine the communication content 109 in a variety of ways using the interference-aware processing mechanism 416.

For example, the message determination module 420 can determine the communication content 109 by combining the signal layer data 210 and the further layer data 212. Also for example, the message determination module 420 can decode, interleave, de-interleave, or a combination thereof with the signal-processing module 418 to further determine the signal layer data 210, the further layer data 212, the interference content 113, or a combination thereof.

The message determination module 420 can use the first communication unit 316, the second communication unit 336, the first control unit 312, the second control unit 334, or a combination thereof to determine the communication content 109. The message determination module 420 can store the determined instance of the communication content 109 or any values or calculations used during the determination process in the first storage unit 314, the second storage unit 346, or a combination thereof.

The communication system 100 can further process the communication content 109 using the first control unit 312, the second control unit 334, or a combination thereof, such as by changing configurations or settings or performing calculations according to the communication content 109. The communication system 100 can also communicate the communication content 109 or a derivation thereof to the user, such as by displaying or by audibly recreating sounds, using the first user interface 318 of FIG. 3, the second user interface 338 of FIG. 3, or a combination thereof.

It has been discovered that the additional-layer adjustment mechanism 428, the interference-aware processing mechanism 416, and the further layer data 212 provides simpler communication protocol and reduces the overhead information. The additional-layer adjustment mechanism 428, the interference-aware processing mechanism 416, and the further layer data 212 can accommodate greater number of transmission layers without being limited by the receiver-antenna count 206. The versatility can eliminate the need to send and receive, or process the receiver-antenna count 206 or related information, which can shorten the protocol requirements and the necessary overhead information.

For illustrative purposes, the transmission module 414 is described as being included in the base station 106 and the receiver module 408 is described as being included in the mobile station 102. However it is understood that the transmission module 414 can be in the mobile station 102 and the receiver module 408 can be in the base station 106. It is further understood that both the transmission module 414 and the receiver module 408 can both be included in the base station 106, the mobile device 102, or a combination thereof.

Figure 5:
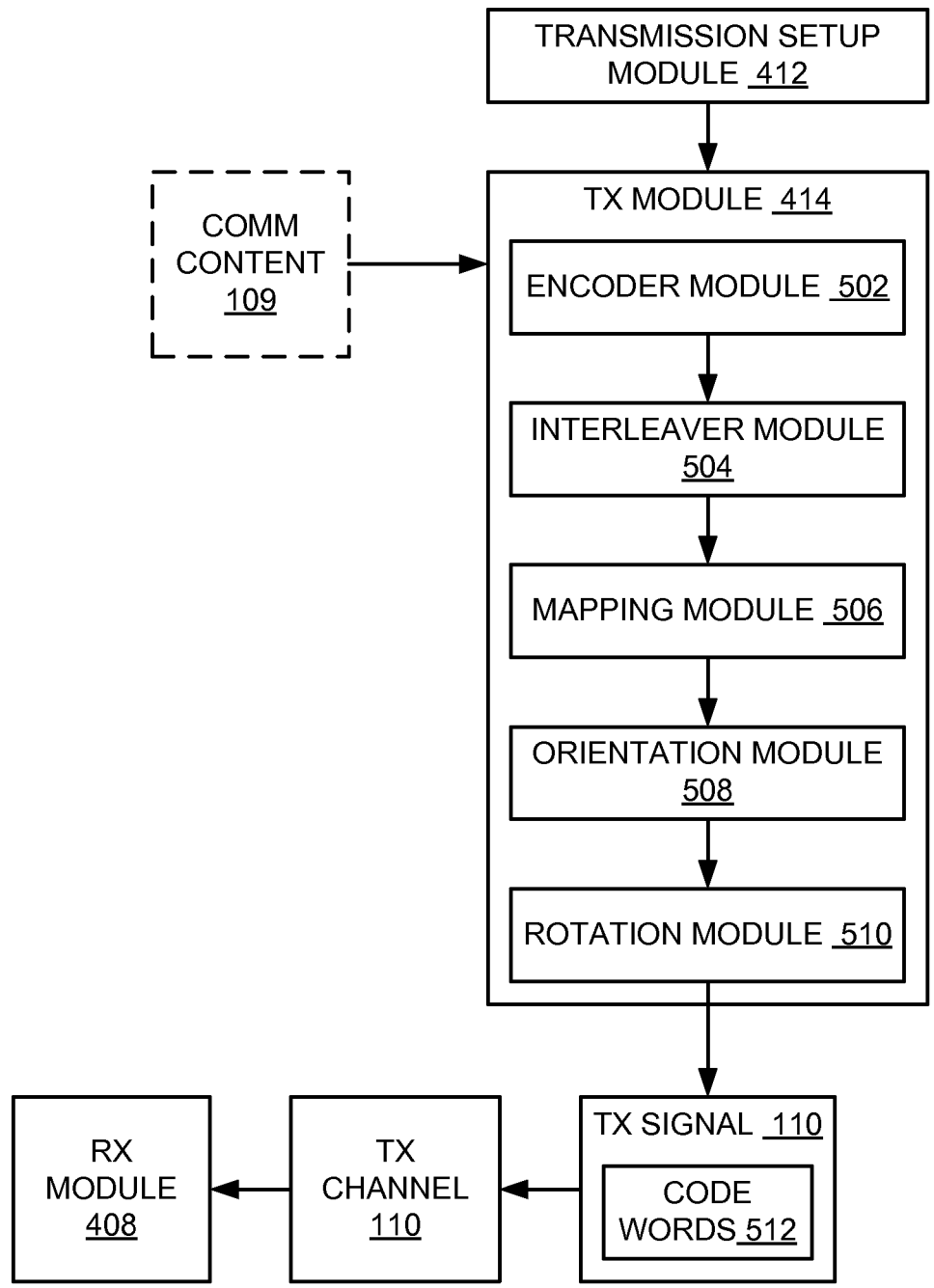
FIG. 5 is an exemplary flow of the transmission module.

Referring now to FIG. 5, therein is shown an exemplary flow of the transmission module 414. The transmission module 414 can include an encoder module 502, an interleaver module 504, a mapping module 506, an orientation module 508, and a rotation module 510.

The encoder module 502 can be coupled to the transmission setup module 412 and the interleaver module 504. The interleaver module 504 can be coupled to the mapping module 506, which can be further coupled to the orientation module 508. The orientation module 508 can be coupled to the rotation module 510, which can be coupled to the receiver module 408 through the transmitter channel 110.

The sub-modules of the transmission module 414 can be coupled to each other in a variety of ways as described above. For example, the outputs of one module can be connected to the inputs of another module. Also for example, the modules can be connected through the network 104 of FIG. 1, the transmitter channel 110, or a combination thereof.

The encoder module 502 is configured to code the communication content 109. The encoder module 502 can code the communication content 109 by adding a header portion, a format portion, an error correction or detection portion, or a combination thereof to the communication content 109 to generate an encoding output. For example, the encoder module 502 can add additional bits based on the communication content 109 for generating the header portion, the format portion, the error correction or detection portion, or a combination thereof according to various coding schemes, such as a turbo coding scheme or a polar coding scheme.

The encoder module 502 can generate the encoding output as $M_T$ number of streams for representing a coded instance of the communication content 109. The encoder module 502 can include a transmission rate of a current code block of a'. The encoder module 502 can determine the transmission rate of a' by measuring channel conditions, such as the serving channel estimate 120 of FIG. 1, feedback information from the mobile device 102 of FIG. 1, such as the receiver-capacity profile 208 of FIG. 2 or a derivation of the serving channel estimate 120 including channel quality information (CQI), or a combination thereof.

For utilizing 'N' number of code words 512, the encoder module 502 can be represented as 'N' number of parallel instances of encoders, with each generating '$M_T/N$' streams for each time instance with code rate of 'R/N'. The code words 512 are units of information having a length predetermined by the communication system 100 for communicating information between devices. The combination of the streams can be the encoding output representing the encoded instance of the communication content 109. Each stream can have equal power.

The encoder module 502 can set '$M_T$' in a variety of ways. For example, the encoder module 502 can set '$M_T$' as the transmitter-antenna count 204 of FIG. 2 for the full-rank transmission mode 220 of FIG. 2, a number between the transmitter-antenna count 204 and the receiver-antenna count 206 of FIG. 2, a number less than the receiver-antenna count 206, or a combination thereof. Also for example, the encoder module 502 can set '$M_T$' based on the receiver-capacity profile 208, the advance receiver notification 218 of FIG. 2, based on ignoring the receiver-antenna count 206, without receiving the receiver-capacity profile 208, or a combination thereof.

It has been determined that setting '$M_T$' based on the receiver-capacity profile 208, the advance receiver notification 218, based on ignoring the receiver-antenna count 206, without receiving the receiver-capacity profile 208, or a combination thereof provides increased efficiency and maximization of available resources for the communication system 100 of FIG. 1. The communication system 100 can utilize the full-rank transmission mode 220 without being limited by the receiver-antenna count 206 based on the advance receiver 216 of FIG. 2, which can increase the throughput. Further, the resources required for reporting feedback information associated with the receiver-antenna count 206 can be reduced or eliminated.

The encoder module 502 can use the first communication unit 316 of FIG. 3, the second communication unit 336 of FIG. 3, the first control unit 312 of FIG. 3, the second control unit 334 of FIG. 3, or a combination thereof to code the communication content 109. The encoder module can store the encoding output as the coded instance of the communication content 109 in the first storage unit 314 of FIG. 3, the second storage unit 346 of FIG. 3, or a combination thereof.

After encoding the communication content 109, the control flow can be passed from the encoder module 502 to the interleaver module 504. The control flow can pass similarly as described above between the receiver resource module 402 of FIG. 4 and the adjustment module 404 of FIG. 4 but using processing results of encoder module 502 instead of results of the receiver resource module 402.

The interleaver module 504 is configured to arrange the encoding output for the coded instance of the communication content 109. The interleaver module 504 can arrange the encoding output according to the coding scheme, such as the turbo coding scheme or the polar coding scheme, for the communication content 109 to generate an interleaving output.

After interleaving the encoding output, the control flow can be passed from the interleaver module 504 to the mapping module 506. The control flow can pass similarly as described above between the receiver resource module 402 and the adjustment module 404 but using processing results of the interleaver module 504 instead of results of the receiver resource module 402.

The mapping module 506 is configured to generate a transmission symbol set from the interleaving output of the interleaver module 504. The mapping module 506 can generate the transmission symbol set as a set of symbols from a constellation designated for communicating between the mobile device 102 and the base station 106 corresponding to a bit level information of the interleaving output.

After generating the transmission symbol set, the control flow can be passed from the mapping module 506 to the orientation module 508. The control flow can pass similarly as described above between the receiver resource module 402 and the adjustment module 404 but using processing results of the mapping module 506 instead of results of the receiver resource module 402.

The orientation module 508 is configured to rearrange the transmission symbol set corresponding to a serial sequence of bits for the communication content 109 for a parallel communication or communication utilizing multiple antennas. The orientation module 508 can execute a serial to parallel rearrangement of the transmission set according to the transmitter-antenna count 204 for the full-rank transmission mode 220 or according to '$M_T$' to generate a parallel symbol set.

After generating the parallel symbol set, the control flow can be passed from the orientation module 508 to the rotation module 510. The control flow can pass similarly as described above between the receiver resource module 402 and the adjustment module 404 but using processing results of the orientation module 508 instead of results of the receiver resource module 402.

The rotation module 510 is configured to transmit the parallel symbol set using a number of antennas corresponding to the transmitter-antenna count 204 for the full-rank transmission mode 220 or corresponding to '$M_T$'. The rotation module 510 can use the first communication unit 316, the second communication unit 336, the first control unit 312, the second control unit 334, or a combination thereof to multiply the parallel symbol set with a precoding matrix.

The precoding matrix can be a format for distributing various sets of data across multiple antennas. The precoding matrix can include unitary matrices as elements, which are not column-permuted version of the other elements. For the parallel symbol set corresponding to a set of streams for the encoding output from the encoder module 502 associated with the N number of the code words 512, the rotation module 510 can multiply the output from the encoder module 502 by a precoding matrix having a size of $M_T$-by-$M_T$.

The precoding matrix can further include a rotation scheme for evenly distributing various instances of the code words 512 across all antennas for transmitting the communication content 109. The rotation module 510 can use the first communication unit 316, the second communication unit 336, the first control unit 312, the second control unit 334, or a combination thereof to implement the rotation scheme.

The rotation module 510 can further use the first communication unit 316, the second communication unit 336, or a combination thereof to transmit the product of multiplying the precoding matrix and the parallel symbol set according to the rotation scheme as the transmitter signal 108. The transmitter signal 108 can traverse through the transmitter channel 110. The receiver module 408 can receive the receiver signal 118 of FIG. 1 including an altered instance of the transmitter signal 108 having been altered from traversing through the transmitter channel 110.

Figure 6:
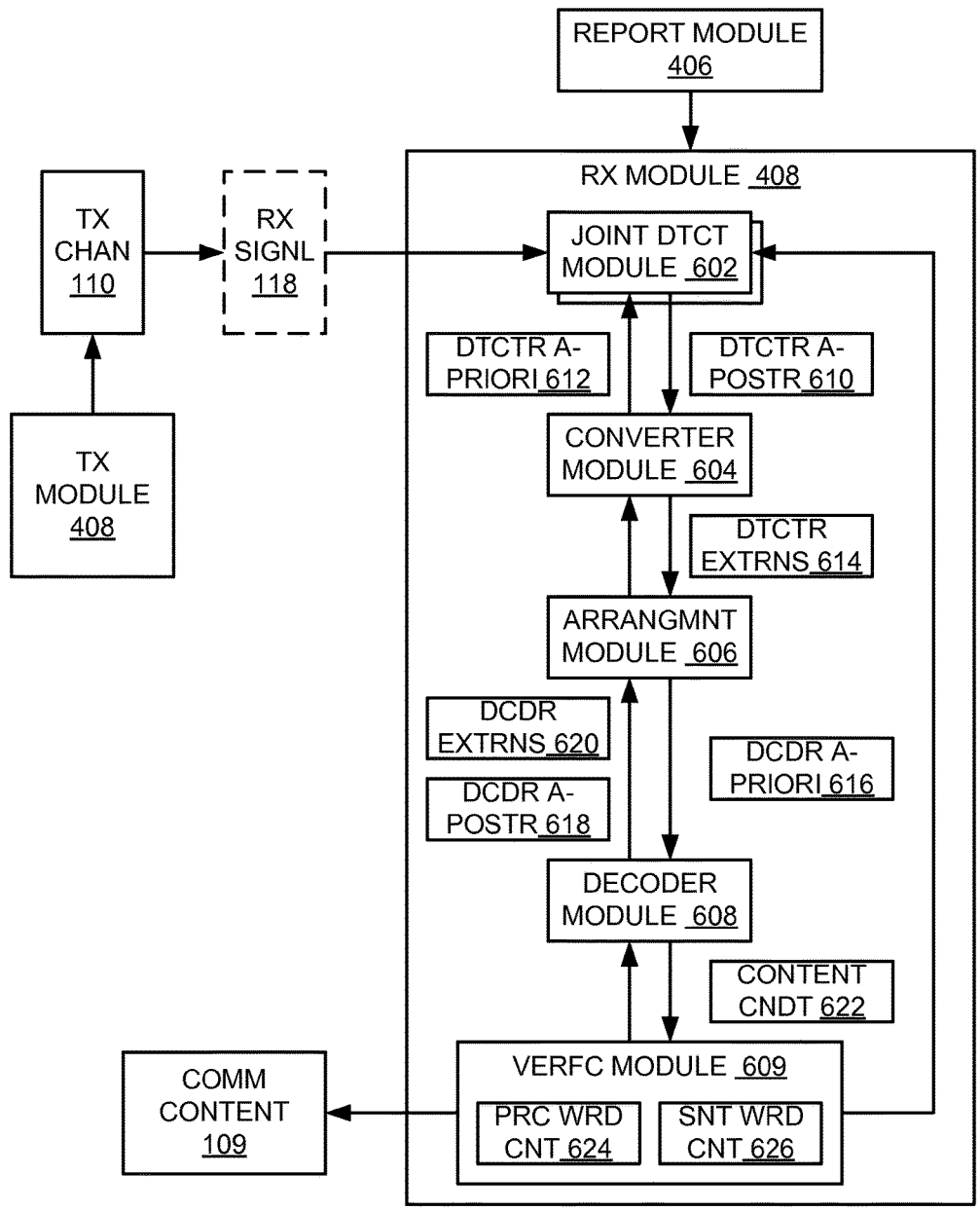
FIG. 6 is an exemplary flow of the receiver module.

Referring now to FIG. 6, therein is shown an exemplary flow of the receiver module 408. The receiver module 408 can include a joint detector module 602, a converter module 604, an arrangement module 606, a decoder module 608, and a verification module 609.

The joint detector module 602, the converter module 604, the arrangement module 606, the decoder module 608, the verification module 609, or a combination thereof can correspond to the signal-processing module 408 of FIG. 4, the message determination module 420 of FIG. 4, or a combination thereof. For example, iterative detection and decoding scheme of the signal-processing module 408 and the message determination module 420 can be represented by the joint detector module 602, the converter module 604, the arrangement module 606, the decoder module 608, and the verification module 609.

Also for example, the joint detector module 602, the converter module 604, and the arrangement module 606 can correspond to the serving layer module 422 of FIG. 4, the interference layer module 424 of FIG. 4, the additional layer module 426 of FIG. 4, or a combination thereof and the message determination module 420, the additional layer module 426, or a combination thereof can correspond to the decoder module 608, the verification module 609, or a combination thereof. As a more specific example, the joint detector module 602, the converter module 604, and the arrangement module 606 can simultaneously or successively perform functions of the serving layer module 422, the interference layer module 424, and the additional layer module 426. For further specific example, the receiver module 408 can include multiple sets of the joint detector module 602, the converter module 604, and the arrangement module 606, each set corresponding to the serving layer module 422, the interference layer module 424, and the additional layer module 426.

For illustrative purpose, the receiver module 408 for this example embodiment will be described as the advance receiver 216 of FIG. 2 for iteratively detecting and decoding the receiver signal 118 for bit-interleaved coded modulation (BICM). However, it is understood that the receiver module 408 can have the interference-aware processing mechanism 416 of FIG. 4 implemented differently as described above. For example, the interference-aware processing mechanism 416 can include an interference-aware detector, an interference-aware decoder, a successive interference determining architecture, or a combination thereof or include an architecture corresponding to the polar coding scheme.

The joint detector module 602 can be coupled to the transmission module 414 through the transmitter channel 110, the converter module 604, and the report module 406. The converter module 604 can be further coupled to the arrangement module 606, which can be coupled to the decoder module 608. The decoder module 608 can be coupled to the verification module 609.

The sub-modules of the receiver module 408 can be coupled to each other in a variety of ways as described above. For example, the outputs of one module can be connected to the inputs of another module. Also for example, the modules can be connected through the network 104 of FIG. 1, the transmitter channel 110, or a combination thereof.

The joint detector module 602 is configured to initially analyze individual symbols or bits within the receiver signal 118. The joint detector module 602 can analyze the individual symbols or bits for the receiver signal 118 corresponding to the transmitter signal 108 of FIG. 1 transmitted using the full-rank transmission mode 220 of FIG. 2 or using $M_T$ transmitter antennas. The joint detector module 602 can analyze the receiver signal 118 having $M_T$ streams of data with less than '$M_T$' receiver antennas for BICM.

The joint detector module 602 can analyze the receiver signal 118 by calculating a detector a-posteriori value 610. The detector a-posteriori value 610 is a later knowledge for the joint detector module 602 about the communication content 109, the transmitter signal 108, the interference content 113 of FIG. 1, the interference signal 114 of FIG. 1, the receiver signal 118, a symbol therein, a bit therein, or a combination thereof. The detector a-posteriori value 610 can be one or more measures of confidence levels associated with a likely transmitted symbol or likelihoods for all possible symbols, or the associated bit values, corresponding to an analyzed portion in the receiver signal 118. The detector a-posteriori value 610 can be a log likelihood ratio (LLR).

The joint detector module 602 can calculate the detector a-posteriori value 610. The joint detector module 602 can calculate the detector a-posteriori value 610 according to:

$$L(A, 1, m) = \log \frac{p(b_k = +1 | y)}{p(b_k = -1 | y)} = \log \frac{\sum_{x:b_k=+1} p(y|x)p(x)}{\sum_{x:b_k=-1} p(y|x)p(x)}. \quad \text{Eqaution (1)}$$

The term '(A, 1, j)' can designate a-posteriori type of value from a detector for $j^{th}$ stream of value up to '$M_T$'. The receiver signal 118 can be represented by 'y' and the transmitter signal 108 can be represented by 'x'.

Equation (1) can be further expanded as:

$$L(A, 1, j) = \log \frac{P(b_{m,n}^D = +1 | y)}{P(b_{m,n}^D = -1 | y)} = \log \frac{\sum_{b^I} \sum_{b^D \in \mathcal{B}_{m,n}^{+1}} P(y | b^D b^I) P(b^D, b^I)}{\sum_{b^I} \sum_{b^D \in \mathcal{B}_{m,n}^{-1}} P(y | b^D b^I) P(b^D, b^I)}. \quad \text{Equation (2)}$$

The notation 'D' can specify correspondence or association to communication content 109, the transmitter signal 108, or a combination thereof intended for communication. The notation 'I' can specify correspondence or association to the interference content 113 of FIG. 1, the interference signal 114 of FIG. 1, or a combination thereof unintended for communication. The terms '$b^D$' and '$b^I$' can be bit vectors consisting of all bits corresponding to the symbol element of '$x_D$' and '$x_I$'. The term '$b_{m,n}$' can represent the $m^{th}$ bit of the $n^{th}$ symbol for the communication content 109, the transmitter signal 108, or a combination thereof.

The joint detector module 602 can further calculate the detector a-posteriori value 610 as an approximation according to:

$$L_{m,n,j}^{(A,1,D)} \approx \max_{x^D \in \chi_{m,n}^{+1}}{}_{x^I}(\mathcal{D}x + \mathcal{L}^{(a,1)}) - \max_{x^D \in \chi_{m,n}^{-1}}{}_{x^I}(\mathcal{D}x + \mathcal{L}^{(a,1)}). \quad \text{Equation (3)}.$$

The term '$\mathcal{D}x$' can represent a Euclidean distance expressed as:

$$\mathcal{D}x = -\|y - H_D x_D - H_I x_I\|^2. \quad \text{Equation (4)}.$$

The term '$\mathcal{L}$' can represent a sum of bit vectors expressed as:

$$\mathcal{L}^{(a,1)} = \frac{1}{2} b^{I+} L^{(a,1,I)} + \frac{1}{2} b^{D+} L^{(a,1,D)}. \quad \text{Equation (5)}$$

Further, the term '$\mathcal{B}_{m,n}^3$' can represent:

$$\mathcal{B}_{m,n}^b = \{b^D | b_{m,n} = b\}. \quad \text{Equation (6)}.$$

The term '$\chi_{m,n}$' can represent:

$$\chi_{m,n}^b = \{x^D | b_{m,n} = b\}. \quad \text{Equation (7)}.$$

The joint detector module 602 can further determine a detector a-priori value 612. The detector a-priori value 612, represented as 'L(a, 1, j)' or '$L^{(a,1,D\ or\ I)}$', is a prior knowledge for the joint detector module 602 about the communication content 109, the transmitter signal 108, the interference content 113, the interference signal 114, the receiver signal 118, a symbol therein, a bit therein, or a combination thereof.

The detector a-priori value 612 can be one or more measures of confidence levels associated with a likely transmitted symbol or likelihoods for all possible symbols, or the associated bit values, corresponding to the analyzed portion in the receiver signal 118. The detector a-posteriori value 610 can be a log likelihood ratio (LLR).

The detector a-priori value 612 can be expressed as:

$$L(a, 1, j) = \log \frac{p(b_k = +1)}{p(b_k = -1)}. \quad \text{Equation (8)}$$

The term '(a, 1, j)' can designate a-priori type of value from the detector for $j^{th}$ stream of value up to $M_T$.

The joint detector module 602 can receive the detector a-priori value 612 from a source external to itself, such as the converter module 604, the arrangement module 606, the decoder module 608, or a combination thereof. The joint detector module 602 can also receive the detector a-priori value 612 from a result calculated on a previous iteration by itself, the converter module 604, the arrangement module 606, the decoder module 608, or a combination thereof.

For example, the detector a-posteriori value 610 can be further processed in the converter module 604, the arrangement module 606, and the decoder module 608 over one or more iterations. The results of the decoder module 608 can also be processed in the arrangement module 606 and the converter module 604, with result of the further processing from the converter module 604 passed to the joint detector module 602.

Continuing with the example, the joint detector module 602 can set the result of the further processing from the converter module 604 as the detector a-priori value 612. The processing of the detector a-posteriori value 610, the processing of the decoder module 608 for information associated with the detector a-posteriori value 610, and the processing of the detector a-priori value 612 related thereto can be over one or more iterations.

The joint detector module 602 can use the first communication unit 316 of FIG. 3, the second communication unit 336 of FIG. 3, the first control unit 312 of FIG. 3, the second control unit 334 of FIG. 3, or a combination thereof to calculate the detector a-posteriori value 610, determine the detector a-priori value 612, or a combination thereof. The joint detector module 602 can store the detector a-posteriori value 610, the detector a-priori value 612, or a combination thereof in the first storage unit 314 of FIG. 3, the second storage unit 346 of FIG. 3, or a combination thereof.

After calculating the detector a-posteriori value 610, the control flow can be passed from the joint detector module 602 to the converter module 604. The control flow can pass similarly as described above between the receiver resource module 402 of FIG. 4 and the adjustment module 404 of FIG. 4 but using processing results of joint detector module 602 instead of results of the receiver resource module 402.

The converter module 604 is configured to rearrange data corresponding to a serial sequence to a parallel sequence. The converter module can rearrange the data resulting from the joint detector module 602. The converter module can also rearrange the data resulting from one or more instance of the joint detector module 602 or from one or more sets of data resulting from the joint detector module 602 corresponding to each instance of the code words 512 of FIG. 5, each instance of the '$M_T$' streams of data, or a combination thereof.

The converter module 604 can be similar to the orientation module 508 of FIG. 5. The converter module 604 can execute a serial to parallel rearrangement of the data according to the total number of the code words 512, the '$M_T$' for the streams of data, or a combination thereof.

The converter module 604 can further calculate a detector extrinsic value 614. The detector extrinsic value 614 is new information that is not derived from received information with respect to the joint detector module 602. The detector extrinsic value 614 can be a calculated or estimated value and represent an improvement, or a difference between instances of processing or calculated results.

The detector extrinsic value 614 can be expressed as:

$$L(\text{ext},1,j)=L(A,1,j)-L(a,1,j).$$ Equation (9).

The term '(ext, 1, j)' can designate extrinsic type of value from the detector for $j^{th}$ stream of value up to '$M_T$'. The converter module 604 calculate the detector extrinsic value 614 by calculating a difference between the detector a-posteriori value 610 and the detector a-priori value 612.

The converter module 604 can use the first communication unit 316, the second communication unit 336, the first control unit 312, the second control unit 334, or a combination thereof to rearrange data and to calculate the detector extrinsic value 614. The converter module 604 can store.

For illustrative purposes, the converter module 604 and the joint detector module 602 are shown and described as separate modules. However, it is understood that the converter module 604 can be a sub-module of the joint detector module 602 or that the functions of the two modules can be performed by a single module. For example, the detector a-posteriori value 610 can be rearranged by the joint detector module 602 and the detector extrinsic value 614 can be calculated by the joint detector module 602.

After calculating the detector extrinsic value 614, the control flow can be passed from the converter module 604 to the arrangement module 606. The control flow can pass similarly as described above between the receiver resource module 402 and the adjustment module 404 but using processing results of the converter module 604 instead of results of the receiver resource module 402.

The arrangement module 606 is configured to interleave or de-interleave data. For example, the arrangement module 606 can de-interleave outputs from the converter module 604 or the joint detector module 602. Also for example, the arrangement module 606 can de-interleave outputs from the decoder module 608. The arrangement module 606 can be similar to the interleaver module 504 of FIG. 5 and interleave or de-interleave data according to the coding scheme, such as the turbo coding scheme or the polar coding scheme.

After interleaving the results of the converter module 604, the control flow can pass from the arrangement module 606 to the decoder module 608. The control flow can pass similarly as described above between the receiver resource module 402 and the adjustment module 404 but using processing results of the arrangement module 606 instead of results of the receiver resource module 402.

The decoder module 608 is configured to further analyze individual symbols or bits within the receiver signal 118 in addition to the joint detector module 602. The decoder module 608 can analyze the individual symbols or bits for the receiver signal 118 corresponding to the transmitter signal 108 transmitted using the full-rank transmission mode 220 or using $M_T$ transmitter antennas. The decoder module 608 can analyze the receiver signal 118 having $M_T$ streams of data with less than $M_T$ receiver antennas for BICM.

The decoder module 608 can determine a decoder a-priori value 616 for analyzing the individual symbols or bits within the receiver signal 118. The decoder a-priori value 616, represented as 'L(a, 2, j)' or '$L^{(a,2,D \text{ or } I)}$', is a prior knowledge for the joint detector module 602 about the communication content 109, the transmitter signal 108, the interference content 113, the interference signal 114, the receiver signal 118, a symbol therein, a bit therein, or a combination thereof.

The decoder a-priori value 616 can be similar to the detector a-priori value 612 but for the decoder module 608. For example, the decoder a-priori value 616 can be one or more measures of confidence levels, including an LLR value. Also for example, the decoder a-priori value 616 can be expressed using Equation (8).

The decoder module 608 can determine the decoder a-priori value 616 by setting the outputs of the arrangement module 606 as the decoder a-priori value 616. For example, the decoder module 608 can determine the decoder a-priori value 616 as the value of the detector extrinsic value 614 or the de-interleaved instance thereof.

The decoder module 608 can further calculate a decoder a-posteriori value 618. The decoder a-posteriori value 618, represented as 'L(A, 2, j)' or '$L^{(A,2,D \text{ or } I)}$', is a later knowledge for the decoder module 608 about the communication content 109, the transmitter signal 108, the interference content 113, the interference signal 114, the receiver signal 118, a symbol therein, a bit therein, or a combination thereof.

The decoder module 608 can calculate the decoder a-posteriori value 618 similar to the joint detector module 602 calculating the detector a-posteriori value 610. For example, the decoder module 608 can calculate the decoder a-posteriori value 618 as one or more measures of confidence levels associated with a likely transmitted symbol or likelihoods for all possible symbols, or the associated bit values, corresponding to an analyzed portion in the receiver signal 118. Also for example, the decoder module 608 can calculate the decoder a-posteriori value 618 using Equations (1)-(7).

The decoder module 608 can also use the decoder a-posteriori value 618 and the decoder a-priori value 616 to calculate a decoder extrinsic value 620. The decoder extrinsic value 620, represented as 'L(ext, 2, j)' or '$L^{(ext,2,D \text{ or } I)}$', is new information that is not derived from received information with respect to the decoder module 608. The decoder module 608 can calculate the decoder extrinsic value 620 similar to the converter module 604 and use Equation (9).

The decoder module 608 can determine and calculate the various values for each of the code words 512. For example, the receiver module 408 can include an instance of the decoder module 608, the joint detector module 602, the converter module, the arrangement module 606, or a combination thereof corresponding to each instance of the code words 512. Also for example, the decoder module 608, the joint detector module 602, the converter module, the arrangement module 606, or a combination thereof can perform multiple iterations or executions, each corresponding to a unique instance of the code words 512.

The decoder module 608 can use the first communication unit 316, the second communication unit 336, the first control unit 312, the second control unit 334, or a combination thereof to determine and calculate the decoder a-posteriori value 618, the decoder a-priori value 616, the decoder extrinsic value 620, or a combination thereof. The decoder module 608 can store the decoder a-posteriori value 618, the decoder a-priori value 616, the decoder extrinsic value 620, or a combination thereof in the first storage unit 314, the second storage unit 346, or a combination thereof.

After determining and calculating the various the results, the control flow can pass from the decoder module 608 to the arrangement module 606. The control flow can pass similarly as described above between the receiver resource module 402 and the adjustment module 404 but using processing results, of the decoder module 608, such as the decoder extrinsic value 620, instead of results of the receiver resource module 402.

The arrangement module 606 can interleave the results of the decoder module 608 for all instances of the code words 512 as described above. The converter module 604 can perform a serial-to-parallel rearrangement for the interleaved results from the arrangement module 606. The joint detector module 602 can receive the decoder extrinsic value 620, or the rearranged and interleaved instance thereof. The joint detector module 602 can set the decoder extrinsic value 620, or the rearranged and interleaved instance thereof as the detector a-priori value 612.

The decoder module 608 can further generate a content candidate 622 from the receiver signal 118. The content candidate 622 is a sequence of data generated from the interaction between the decoder module 608 and the joint detector module 602. The content candidate 622 can be determining a sequence of symbols, bits, or a combination thereof generated from the iterative process that can be further verified as the communication content 109.

For example, the decoder module 608 can utilize the maximum-likelihood mechanism, maximum a-posteriori or Bayesian mechanism, the minimum mean square error mechanism, the derivation thereof, or a combination thereof to determine the sequence of symbols, bits, or a combination thereof having satisfactory results shown by the decoder a-posteriori value 618, the decoder extrinsic value 620, or a combination thereof to generate the content candidate 622. Also for example, the decoder module 608 can generate the content candidate 622 as the sequence of symbols, bits, or a combination thereof passing an error check, such as using low-density parity-check (LDPC) or cyclic redundancy check (CRC).

The decoder module 608 can pass the content candidate 622 to the verification module 609. The verification module 609 is configured to determine the communication content 109. The verification module 609 can generate the communication content 109 by verifying the content candidate 622. The verification module 609 can determine the communication content 109 as the content candidate 622 when a processing word count 624 is equal to a sent word count 626.

The verification module 609 can determine the processing word count 624 by counting a number of instances of the code words 512 in the content candidate 622. The verification module 609 can determine the sent word count 626, corresponding to the 'N' number of the code words 512, from the format portion, the header portion, or a combination thereof in the receiver signal 118, as predetermined by the communication system 100 or a standard, or a combination thereof.

The verification module 609 can determine the communication content 109 as the content candidate 622 when the processing word count 624 is equal to the sent word count 626. The verification module 609 can signal the decoder module 608, the joint detection module 602, other modules, or a combination thereof to continue processing until all instances of the code words 512 have been processes and the processing word count 624 is equal to the sent word count 626.

For example, the verification module 609 can signal the decoder module 608 to continue the detection and decoding process when the desired instance of the code word has been decoded but the processing word count 624 is less than the sent word count 626. Also for example, the verification module 609 can signal the joint detector module 602 in a similar way. The joint detector module 602 can further detect and continue the overall process described above using the receiver signal 118, the content candidate 622, a difference between the receiver signal 118 and the content candidate 622 passed from the verification module 609, or a combination thereof.

The verification module 609 can determine the communication content 109 based on the receiver-capacity profile 208. For example, the verification module 609 can determine and compare the sent word count 626 and the processing word count 624 when the receiver-capacity profile 208 includes a number corresponding to antennas greater than the receiver-antenna count 206, includes the advance receiver notification 218, or a combination thereof. Also for example, the verification module 609 can stop the process when the decoder module 608 determines the desired instance of the code words 512 and determine the communication content 109.

For illustrative purposes the joint detector module 602, the converter module, and the decoder module 608, have been described as calculating and determining a-priori, a-posteriori, and extrinsic values corresponding to the communication content 109. However, it is understood that the joint detector module 602, the converter module, and the decoder module 608 can also calculate and determine a-priori, a-posteriori, and extrinsic values corresponding to the interference content 113.

For example, the joint detector module 602, the converter module, the decoder module 608, and the verification module 609 can use the interference-aware processing mechanism 416, such as methods or configurations, to iteratively or simultaneously calculate and determine values corresponding to both the interference content 113 and the communication content 109. As a more specific example, the receiver module 408 can include sets of the joint detector module 602, the converter module, the decoder module 608, or a combination thereof or execution sequences for the modules dedicated to each of the code words 512, each of '$M_T$' streams, corresponding to the communication content 109, corresponding to the interference content 113, or a combination thereof.

The receiver module 408 can use the additional-layer adjustment mechanism 428 of FIG. 4 to further determine the further layer data 212 of FIG. 2. For example, the decoder module 608 and the verification module 609 can include the additional-layer adjustment mechanism 428 to continue calculating and passing the decoder extrinsic data 620 when a desired instance of the code words 512 is successfully decoded. Also for example, the decoder module 608 and the verification module 609 can implement the additional-layer adjustment mechanism 428 by using the processing word count 624 and the content candidate 616 for calculating the decoder extrinsic data 620 until all instances of the code words 512 are decoded.

The additional-layer adjustment mechanism 428 can allow the decoder module 608 to control continued processing of the receiver signal 118. The processing of the receiver signal 118 using the joint detector module 602 and the decoder module 608 can simultaneously or iteratively determine the signal layer data 210, the further layer data 212, and the interference content 113. The additional-layer adjustment mechanism 428 can require the decoder module 608 to generate the communication content 109 having the signal layer data 210 and the further layer data 212 when all instances of the code words 512 are decoded, when the processed result passes the error check, or a combination thereof.

It has been discovered that the additional-layer adjustment mechanism 428 implemented as generating the communication content 109 using the content candidate 616 and the processing word count 624 provides improved throughput of under-determined, open-loop systems. The decoder module 608 and the verification module 609 can implement the additional-layer adjustment mechanism 428 to decode all instances of the code words 512 in addition to successfully decoding the desired instance of the code words 512. The additional-layer adjustment mechanism 428 can enable the advance receiver 216 to process increased amounts of data transmitted using a number layers exceeding the receiver-antenna count 206.

The communication system 100 has been described with module functions or order as an example. The communication system 100 can partition the modules differently or order the modules differently. For example, functions of the serving layer module 422 of FIG. 4, the interference layer module 424 of FIG. 4, the additional layer module 426, of FIG. 4 or a combination thereof can be combined or the additional layer module 420 of FIG. 4 can be a part of the message determination module 420. Also as an example, functions of the signal-processing module 418 of FIG. 4 can be iteratively interleaved and rearranged with that of the message determination module 420. For further example, the signal receiving function for receiving the receiver-capacity profile 208 of FIG. 2 of the transmitter resource module 410 of FIG. 4 can be in a separate module independent from the transmitter resource module 410.

The modules described in this application can be hardware implementation or hardware accelerators, including passive circuitry, active circuitry, or both, in the first control unit 216 of FIG. 2 or in the second control unit 238 of FIG. 2. The modules can also be hardware implementation or hardware accelerators, including passive circuitry, active circuitry, or both, within the first device 102 of FIG. 1 or the second device 106 of FIG. 1 but outside of the first control unit 216 or the second control unit 238, respectively.

The physical transformation from the receiver-antenna count 206 of FIG. 2 or the receiver-capacity profile 208 results in the movement in the physical world, such as content displayed or recreated for the user on the mobile device 102 or the number of antennas used to communicate such content between devices. The content, such as navigation information or voice signal of a caller, recreated on the first device 102 can influence the user's movement, such as following the navigation information or replying back to the caller. Movement in the physical world results in changes to the interference signal 114 of FIG. 1 or serving channel estimate 120 of FIG. 1, which can be fed back into the system to influence the content or a determination thereof.

Figure 7:
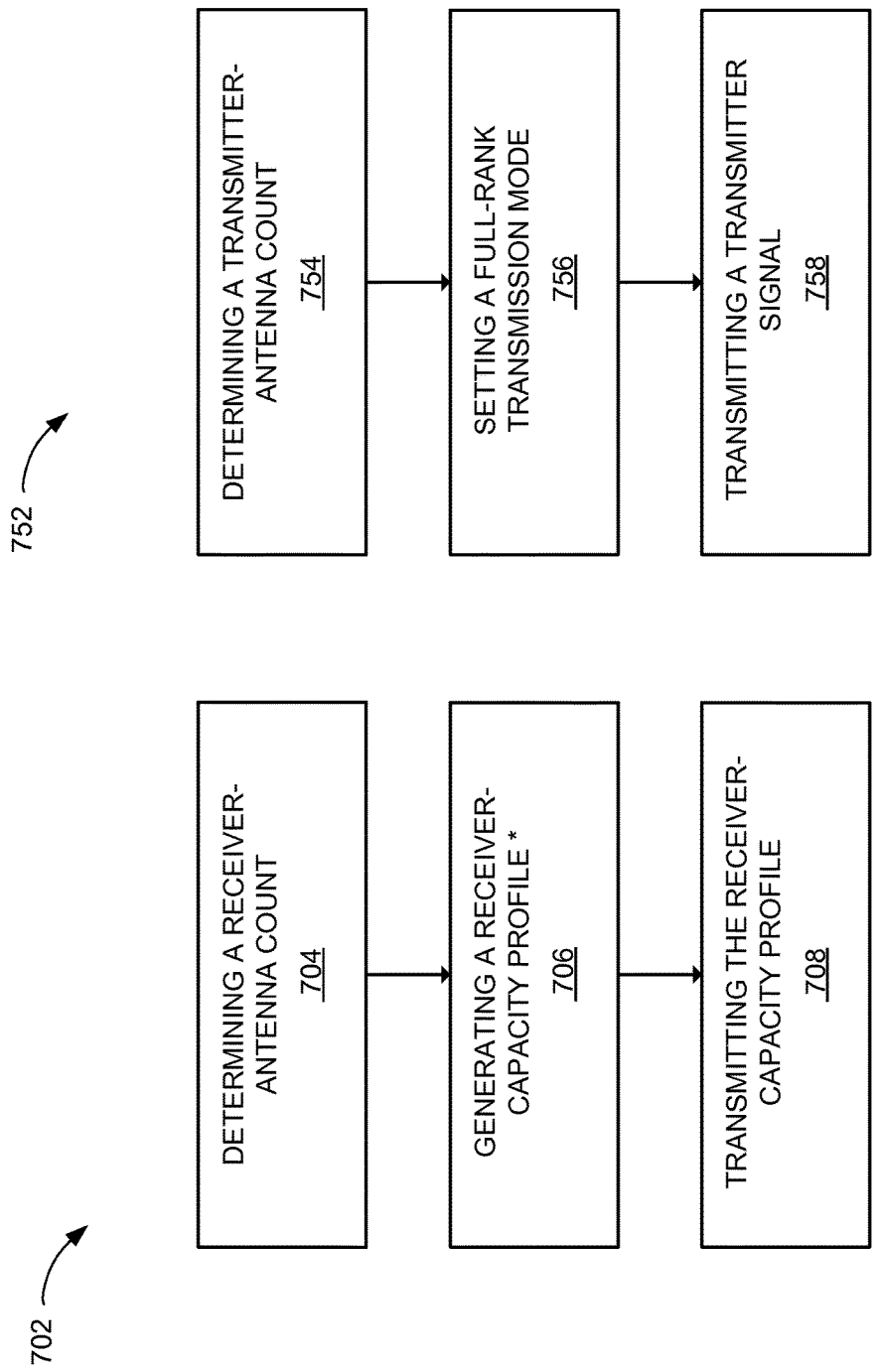
FIG. 7 is a flow chart of a method of operation of a communication system in an embodiment of the present invention.

Referring now to FIG. 7, therein is shown a flow chart of a method 702 and a method 752 of operation of a communication system 100 in an embodiment of the present invention. The method 702 includes: determining a receiver-antenna count for characterizing a device in a block 704; generating a receiver-capacity profile exceeding a capability associated with the receiver-antenna count with a control unit in a block 706; and transmitting the receiver-capacity profile for communicating a communication content for communicating with the device in a block 708.

The method 752 includes: determining a transmitter-antenna count for transmitting to a device in a block 754; setting a full-rank transmission mode for all antennas corresponding to the transmitter-antenna count in a block 756; and transmitting a transmitter signal according to the full-rank transmission mode regardless of a receiver-capacity profile for communicating with the device in a block 758.

It has been discovered that the use of the advance receiver 216 of FIG. 2 when the transmitter-antenna count 204 of FIG. 2 is greater than the receiver-antenna count 206 of FIG. 2 maximizes throughput. It has also been discovered that the receiver-capacity profile 208 of FIG. 2 indicating a number exceeding the receiver-antenna count 206 when the communication system 100 of FIG. 1 includes the advance receiver 216 provides increased throughput for the communication system 100.

It has further been discovered that the receiver-capacity profile 208 including the advance receiver notification 218 of FIG. 2 provides increased efficiency and maximization of available resources for the communication system 100. Moreover, it has been discovered that the additional-layer adjustment mechanism 428 of FIG. 4, the interference-aware processing mechanism 416 of FIG. 4, and the further layer data 212 of FIG. 2 provides simpler communication protocol and reduces the overhead information.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of an embodiment of the present invention is that it valuably supports and services the historical trend of reducing costs, simplifying systems, and increasing performance.

These and other valuable aspects of an embodiment of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. A communication system comprising:
a control unit configured to:
  determine a receiver-antenna count for characterizing a device;
  identify an interference-aware processing mechanism for decoding an interference content along with communication content at the device;
  generate a receiver-capacity profile exceeding a capability associated with the receiver-antenna count based on:
    the interference-aware processing mechanism for representing the receiver-capacity profile corresponding to a number of streams greater than the receiver-antenna count to decode additional data corresponding to the number of streams as the communication content instead of processing as the interference content, and
    a precoding matrix including a rotation scheme for circularly-shifting allocation of code words across the streams with a quantity of the code words matching the number of streams for simultaneous communication, wherein the precoding matrix corresponds to the number of streams, the precoding matrix including unitary matrices as elements, wherein the elements are non-column-permuted version of other elements; and
a communication unit, coupled to the control unit, configured to transmit the receiver-capacity profile for communicating the communication content with the device.

2. The system as claimed in claim 1 wherein:
the communication unit is further configured to receive a receiver signal; and
the control unit is further configured to determine the communication content from the receiver signal using the interference-aware processing mechanism.

3. The system as claimed in claim 1 wherein:
the communication unit is further configured to receive a receiver signal according to the receiver-capacity profile;
the control unit is further configured to:
  determine a signal layer data associated with the receiver-antenna count from the receiver signal, and
  determine a further layer data associated with a difference between the receiver-antenna count and the receiver-capacity profile using the interference-aware processing mechanism for processing the receiver signal using the signal layer data and the further layer data.

4. The system as claimed in claim 1 wherein:
the communication unit is further configured to receive a receiver signal according to the receiver-capacity profile;
the control unit is further configured to:
  determine the interference content associated with a difference between the receiver-antenna count and the receiver-capacity profile from the receiver signal using the interference-aware processing mechanism, and
  determine a further layer data from the interference content for processing a portion of the receiver signal.

5. The system as claimed in claim 1 wherein the control unit is further configured to generate an advance receiver notification.

6. A communication system comprising:
a control unit configured to:
  determine a transmitter-antenna count for transmitting to a device including an interference-aware processing mechanism for decoding an interference content along with communication content at the device;
  set a full-rank transmission mode for all antennas corresponding to the transmitter-antenna count;
a communication unit, coupled to the control unit, configured to transmit a transmitter signal according to the full-rank transmission mode and a precoding matrix including a rotation scheme for circularly-shifting allocation of code words across antennas with a quantity of the code words matching the number of the antennas for the full-rank transmission mode, regardless of a receiver-capacity profile, wherein:
  the precoding matrix corresponds to a number of streams for the full-rank transmission, the precoding matrix including unitary matrices as elements, wherein the elements are non-column-permuted version of other elements, and
  the receiver-capacity profile is for communicating with the device utilizing the interference-aware processing mechanism to decode additional data as the communication content instead of processing as the interference content with the additional data corresponding to the full-rank transmission mode exceeding a receiver-antenna count of the device.

7. The system as claimed in claim 6 wherein the communication unit is further configured to transmit the transmitter signal including simultaneously transmitting at least a portion of each of the code words allocated to each of the antennas according to the rotation scheme.

8. The system as claimed in claim 6 wherein the control unit is further configured to set the full-rank transmission mode without receiving the receiver-capacity profile or based on ignoring a receiver-antenna count indicated by a received instance of the receiver-capacity profile.

9. A method of operation of a communication system comprising:
　determining a receiver-antenna count for characterizing a device;
　identifying an interference-aware processing mechanism for decoding an interference content along with communication content at the device;
　generating with a control unit a receiver-capacity profile exceeding a capability associated with the receiver-antenna count based on:
　　the interference-aware processing mechanism for representing the receiver-capacity profile corresponding to a number of streams greater than the receiver-antenna count to decode additional data corresponding to the number of streams as the communication content instead of processing as the interference content, and
　　a precoding matrix including a rotation scheme for circularly-shifting allocation of code words across the streams with a quantity of the code words matching the number of streams for simultaneous communication, wherein the precoding matrix corresponds to the number of streams, the precoding matrix including unitary matrices as elements, wherein the elements are non-column-permuted version of other elements; and
　transmitting the receiver-capacity profile for communicating the communication content with the device.

10. The method as claimed in claim 9 further comprising:
　receiving a receiver signal according to the receiver-capacity profile; and
　determining the communication content from the receiver signal using the interference-aware processing mechanism.

11. The method as claimed in claim 9 further comprising:
　receiving a receiver signal according to the receiver-capacity profile;
　determining a signal layer data associated with the receiver-antenna count from the receiver signal; and
　determining a further layer data associated with a difference between the receiver-antenna count and the receiver-capacity profile using the interference-aware processing mechanism for processing the receiver signal using the signal layer data and the further layer data.

12. The method as claimed in claim 9 further comprising:
　receiving a receiver signal according to the receiver-capacity profile;
　determining an interference content associated with a difference between the receiver-antenna count and the receiver-capacity profile from the receiver signal using the interference-aware processing mechanism; and
　determining a further layer data from the interference content for processing a portion of the receiver signal.

13. The method as claimed in claim 9 wherein generating the receiver-capacity profile includes generating an advance receiver notification.

14. A method of operation of a communication system comprising:
　determining a transmitter-antenna count for transmitting to a device, including an interference-aware processing mechanism for decoding an interference content along with communication content at the device;
　setting a full-rank transmission mode for all antennas corresponding to the transmitter-antenna count;
　transmitting a transmitter signal according to the full-rank transmission mode and a precoding matrix including a rotation scheme for circularly-shifting allocation of code words across antennas with a quantity of the code words matching the number of the antennas for the full-rank transmission mode, regardless of a receiver-capacity profile, wherein:
　　the precoding matrix corresponds to a number of streams for the full-rank transmission, the precoding matrix including unitary matrices as elements, wherein the elements are non-column-permuted version of other elements, and
　　the receiver-capacity profile is for communicating with the device utilizing the interference-aware processing mechanism to decode additional data as the communication content instead of processing as the interference content with the additional data corresponding to the full-rank transmission mode exceeding a receiver-antenna count of the device.

15. The method as claimed in claim 14 wherein transmitting the transmitter signal includes transmitting the transmitter signal including simultaneously transmitting at least a portion of each of the code words allocated to each of the antennas according to the rotation scheme.

16. The method as claimed in claim 14 wherein setting the full-rank transmission mode includes setting the full-rank transmission mode without receiving the receiver-capacity profile or based on ignoring a receiver-antenna count indicated by a received instance of the receiver-capacity profile.

* * * * *